(12) United States Patent
Sasaki

(10) Patent No.: US 10,241,317 B2
(45) Date of Patent: Mar. 26, 2019

(54) IMAGE PROCESSING APPARATUS AND IMAGING APPARATUS

(71) Applicant: CANON KABUSHIKI KAISHA, Tokyo (JP)

(72) Inventor: Toru Sasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 147 days.

(21) Appl. No.: 15/303,945

(22) PCT Filed: May 8, 2015

(86) PCT No.: PCT/JP2015/002351
§ 371 (c)(1),
(2) Date: Oct. 13, 2016

(87) PCT Pub. No.: WO2015/174057
PCT Pub. Date: Nov. 19, 2015

(65) Prior Publication Data
US 2017/0038576 A1 Feb. 9, 2017

(30) Foreign Application Priority Data

May 15, 2014 (JP) .................. 2014-101078
Jan. 15, 2015 (JP) .................. 2015-006071

(51) Int. Cl.
*H04N 5/265* (2006.01)
*G02B 21/36* (2006.01)
*H04N 5/232* (2006.01)

(52) U.S. Cl.
CPC ....... *G02B 21/367* (2013.01); *H04N 5/23238* (2013.01); *H04N 5/265* (2013.01)

(58) Field of Classification Search
CPC . G06T 3/0093; G06T 2200/32; G06T 3/0062; G06T 7/80; G06T 7/0012;
(Continued)

(56) References Cited

U.S. PATENT DOCUMENTS

| 6,633,303 | B2 | 10/2003 | Nakajima |
| 7,227,557 | B2 | 6/2007 | Nakajima |
| 2012/0002033 | A1 | 1/2012 | Yamane et al. |
| 2012/0147232 | A1 | 6/2012 | Takayama et al. |
| 2014/0362205 | A1 | 12/2014 | Sasaki |

(Continued)

FOREIGN PATENT DOCUMENTS

| JP | 2001-320579 A | 11/2001 |
| JP | 2002-150262 A | 5/2002 |
| JP | 2009-063658 A | 3/2009 |

OTHER PUBLICATIONS

International Search Report and Written Opinion issued in International Application No. PCT/JP2015/002351 dated Jul. 28, 2015.
(Continued)

*Primary Examiner* — Anand S Rao
*Assistant Examiner* — Samuel D Fereja
(74) *Attorney, Agent, or Firm* — Venable LLP

(57) ABSTRACT

An apparatus comprises a unit that manages, state information including information indicating whether the acquisition of partial image data is completed; a acquiring unit that acquires, for each of stitching places of the partial image data, a correction amount for correcting local deviation among the partial image data to be stitched; and a unit that corrects each of the partial image data on the basis of the correction amount, and generating combined image data obtained by stitching the partial image data after the correction. The acquiring unit is controlled on the basis of the state information to start processing for acquiring the correction amount from the partial image data or the stitching place for which acquisition of data necessary for acquiring the correction amount is completed.

15 Claims, 24 Drawing Sheets

(58) Field of Classification Search
CPC . G06T 2207/10016; G06T 2207/10056; G06T 2200/24; G06T 7/70; G06T 1/0007; G06T 2207/10081; G06T 2207/20021; G06T 7/32; G06T 7/73; G06T 2200/04; G06T 2207/10008; G06T 2207/10152; G06T 2207/30004; G06T 2207/30041; G06T 2207/30048; G06T 2207/30164; G06T 2207/30196; G06T 2207/30204; G06T 2210/16; G06T 3/0012; G06T 7/0002; G06T 7/0018

See application file for complete search history.

(56) References Cited

U.S. PATENT DOCUMENTS

| | | | |
|---|---|---|---|
| 2015/0234171 A1 | 8/2015 | Sasaki | |
| 2015/0241686 A1* | 8/2015 | Abe | G02B 21/367 348/79 |
| 2016/0187638 A1* | 6/2016 | Miyoshi | G02B 21/06 348/79 |

OTHER PUBLICATIONS

Notification Concerning Transmittal of International Preliminary Report on Patentability and Written Opinion of the International Search Authority issued in counterpart International Patent Application No. PCT/JP2015/002351, dated Nov. 24, 2016.

* cited by examiner

FIG.18A

PROCESS MANAGEMENT TABLE 1201

| STATE NUMBER | EXECUTION STATE |
|---|---|
| 0 | 2 |
| 1 | 1 |
| 2 | 1 |
| ... | ... |
| N | 0 |

0 → UN-ACQUIRED STATE 921
1 → DATA RECEIVED STATE 923
2 → DEFORMATION CORRECTION EXECUTION STATE 942
3 → DEFORMATION CORRECTION COMPLETED STATE 943

FIG.18B

ALIGNMENT MANAGEMENT TABLE 1202

| OVERLAPPING SEGMENT NUMBER | EXECUTION STATE |
|---|---|
| 0 | 1 |
| 1 | 0 |
| 2 | 2 |
| ... | ... |
| N | 1 |

0 → LOCAL ALIGNMENT UNEXECUTED STATE 930
1 → LOCAL ALIGNMENT UNEXECUTABLE STATE 931
2 → LOCAL ALIGNMENT EXECUTION STATE 932
3 → LOCAL ALIGNMENT COMPLETED STATE 933

FIG.18C

FORWARD DIRECTION CORRESPONDENCE RELATION TABLE 1203

| STATE NUMBER | OVERLAPPING SEGMENT NUMBER LIST |
|---|---|
| 0 | 0, 1, 5 |
| 1 | 1, 2, 5 |
| 2 | 2, 3, 4 |
| ... | ... |
| N | M-3, M |

FIG.18D

BACKWARD DIRECTION CORRESPONDENCE TABLE 1204

| OVERLAPPING SEGMENT NUMBER | STATE NUMBER LIST |
|---|---|
| 0 | 0, 3 |
| 1 | 0, 1 |
| 2 | 1, 2 |
| ... | ... |
| M | N, N-5 |

FIG.18E

GLOBAL ALIGNMENT EXECUTION STATE ARRAY 1205

| INDEX | EXECUTION STATE |
|---|---|
| 0 | 1 |
| 1 | 0 |
| 2 | 1 |
| 3 | 0 |

0 → GLOBAL ALIGNMENT UNEXECUTED STATE 935
1 → GLOBAL ALIGNMENT EXECUTION STATE 936
2 → GLOBAL ALIGNMENT COMPLETED STATE 937

| STATE NUMBER | UPPER SIDE y COORDINATE VALUE (PIXEL) | LOWER SIDE y COORDINATE VALUE (PIXEL) | LEFT SIDE x COORDINATE VALUE (PIXEL) | RIGHT SIDE x COORDINATE VALUE (PIXEL) |
|---|---|---|---|---|
| 0 | 2500 | 0 | 0 | 2500 |
| 1 | 2500 | 0 | 2000 | 4500 |
| 2 | 2500 | 0 | 4000 | 6500 |
| ... | ... | | | |
| N | 10500 | 8000 | 8000 | 10500 |

FIG.20A  SIDE COORDINATE TABLE  1401

| No. | STATE NUMBER SET | CENTER POSITION (PIXEL) | WIDTH ALONG x, y AXIS (PIXEL) |
|---|---|---|---|
| 0 | 0,1 | (2250, 1000) | (500, 2500) |
| 1 | 1,2 | (4250, 1000) | (500, 2500) |
| 2 | 2,3 | (6250, 1000) | (500, 2500) |
| ... | ... | | |
| N | N-1, N | (8250, 8250) | (500, 2500) |

FIG.20B  STATE NUMBER SET TABLE  1402

IMAGE PROCESSING APPARATUS AND IMAGING APPARATUS

TECHNICAL FIELD

The present invention relates to an image processing apparatus having a function of stitching images together.

BACKGROUND ART

In recent years, in order to solve problems such as a shortage of pathologists and remote location medical care, importance of diagnosis performed using pathological specimen images is increasing. The pathological specimen images are acquired by a microscope including an electric stage or a medical slide scanner (hereinafter referred to as microscope imaging system). However, it is necessary to overcome a large number of technical problems in order to acquire highly accurate images fit for diagnosis.

As one of the technical problems, a problem concerning stitching of images is known. A range of a specimen that can be imaged by an objective lens of a digital microscope is small compared with the entire specimen and is usually equal to or smaller than one hundredths of the specimen. Therefore, in order to acquire image data of the entire specimen, it is necessary to dividedly image the specimen a plurality of times while changing positions (divided imaging) and stitch an obtained plurality of image data.

Partial image data acquired in one imaging (hereinafter referred to as tile) is acquired while the while moving a specimen at a fixed interval at a time using an electric stage. However, positional deviation is caused by the influence of backlash of the stage or the like and an image is affected by the positional deviation. As a result, when tiles are simply arranged, a difference occurs in stitches. Image data representing the entire specimen (hereinafter, "entire image") is not obtained. Therefore, in general, tiles are acquired such that peripheral sections of tiles adjacent to each other overlap. An entire image is formed after positional deviation correction is performed to match the shapes of overlapping places. Correction of distortion aberration of an objective lens, rotation of an image, and the like is also performed.

When the entire surface of one pathological specimen is imaged, the number of tiles acquired by a microscope imaging system exceeds one thousand (in the case of 20 million pixels/one tile). Therefore, there is a demand for an increase in speed of the stitching.

In a stitching method in a document scanner disclosed in Patent Literature 1, components in a document is imaged avoiding a blank segment in the document and only the components are stitched to attain an increase in speed.

In an editing method for a plurality of images disclosed in Patent Literature 2, partial image data sent from a server is reconfigured into an entire image on a PC. In this method, making use of the fact that the positions and the sizes of partial images sent to the server are known, reconfiguration processing is executed in a waiting time in arrival of the partial images at the PC to increase speed.

CITATION LIST

Patent Literature

[PTL 1]
Japanese Patent Application Laid-Open No. 2001-320579
[PTL 2]
Japanese Patent Application Laid-Open No. 2002-150262

SUMMARY OF INVENTION

Technical Problem

The microscope imaging system adopts a configuration for performing divided imaging of a specimen in an imaging apparatus (a microscope apparatus), sequentially transferring obtained partial image data to an image processing apparatus, and performing stitching processing in the image processing apparatus. In this configuration, if order or timing of arrival of the partial image data at the image processing apparatus are known in advance or are predictable, it is relatively easy to optimize and speed up the stitching processing in the image processing apparatus. However, in reality, there are problems explained below.

When the imaging is performed avoiding the blank segment (a portion where a sample is absent) as in the method described in Patent Literature 1, in some cases, the imaging order of the tiles changes and imaging of stitching target adjacent tiles is delayed. In some cases, tiles stored in another image server and tiles imaged by the microscope imaging system are stitched. However, timing when the tiles arrive at the image processing apparatus is not decided.

When the arriving order of the tiles at the imaging processing apparatus is not decided in this way, even if the waiting time of the tile arrival is used as in the method described in Patent Literature 2, the arrival of the adjacent tiles is delayed and speed is not sufficiently increased.

It is also conceivable to speed up the stitching processing using parallel processing by a multiprocessor. However, when the arriving order of the tiles at the image processing apparatus is not decided, since the delay of the arrival of the adjacent tiles affects the stitching processing, stitching speed performance that can be expected from parallelism of an algorithm cannot be attained.

The present invention has been devised in view of the circumstances and it is an object of the present invention to provide a technique for efficiently executing processing for stitching a plurality of partial image data to generate combined image data. In particular, it is an object of the present invention to provide a technique for, under an environment in which acquisition order and acquisition timing of a plurality of partial image data could change, efficiently executing stitching processing of the partial image data.

Solution to Problem

A first aspect of the present invention resides in an image processing apparatus that stitches a plurality of partial image data to generate combined image data, the image processing apparatus comprising: an image acquiring unit that sequentially acquires the plurality of partial image data; a state managing unit that manages, as state information indicating a state of processing for each of the plurality of partial image data, state information including at least information indicating whether the acquisition of the data by the image acquiring unit is completed; a correction-amount acquiring unit that acquires, for each of stitching places of the partial image data, a correction amount for correcting local deviation among the partial image data to be stitched; and an image combining unit that corrects each of the plurality of partial image data on the basis of the correction amount for each of the stitching places acquired by the correction-amount acquiring unit, and generates combined image data obtained by stitching the partial image data after the correction, wherein the correction-amount acquiring unit is controlled on the basis of the state information to start processing for acquiring the correction amount from the partial image data or the stitching place for which acquisition of data necessary for acquiring the correction amount is completed.

A second aspect of the present invention resides in an imaging system comprising: an imaging apparatus that dividedly images an object to obtain a plurality of partial images; and the image processing apparatus according to the present invention that acquires the plurality of partial image data from the imaging apparatus and stitches the plurality of partial image data to generate combined image data.

A third aspect of the present invention resides in a control method for an image processing apparatus that stitches a plurality of partial image data to generate combined image data, the control method comprising: an image acquiring step for sequentially acquiring the plurality of partial image data; a state managing step for managing, as state information indicating a state of processing for each of the plurality of partial image data, state information including at least information indicating whether the acquisition of the data in the image acquiring step is completed; a correction-amount acquiring step for acquiring, for each of stitching places of the partial image data, a correction amount for correcting local deviation among the partial image data to be stitched; and an image combining step for correcting each of the plurality of partial image data on the basis of the correction amount for each of the stitching places acquired in the correction-amount acquiring step, and generating combined image data obtained by stitching the partial image data after the correction, wherein the correction-amount acquiring step is controlled on the basis of the state information to start processing for acquiring the correction amount from the partial image data or the stitching place for which acquisition of data necessary for acquiring the correction amount is completed.

Advantageous Effects of Invention

According to the present invention, it is possible to efficiently execute processing for stitching a plurality of partial image data to generate combined image data. In particular, even under an environment in which acquisition order and acquisition timing of a plurality of partial image data could change, it is possible to efficiently execute stitching processing of the partial image data.

Further features of the present invention will become apparent from the following description of exemplary embodiments with reference to the attached drawings.

BRIEF DESCRIPTION OF DRAWINGS

FIGS. 18A to 18E are examples of arrays used for management of a processing execution state in the second embodiment.

FIGS. 20A and 20B are examples of a table generated in the state allocation processing in the second embodiment.

DESCRIPTION OF EMBODIMENTS

First Embodiment

Figure 2:
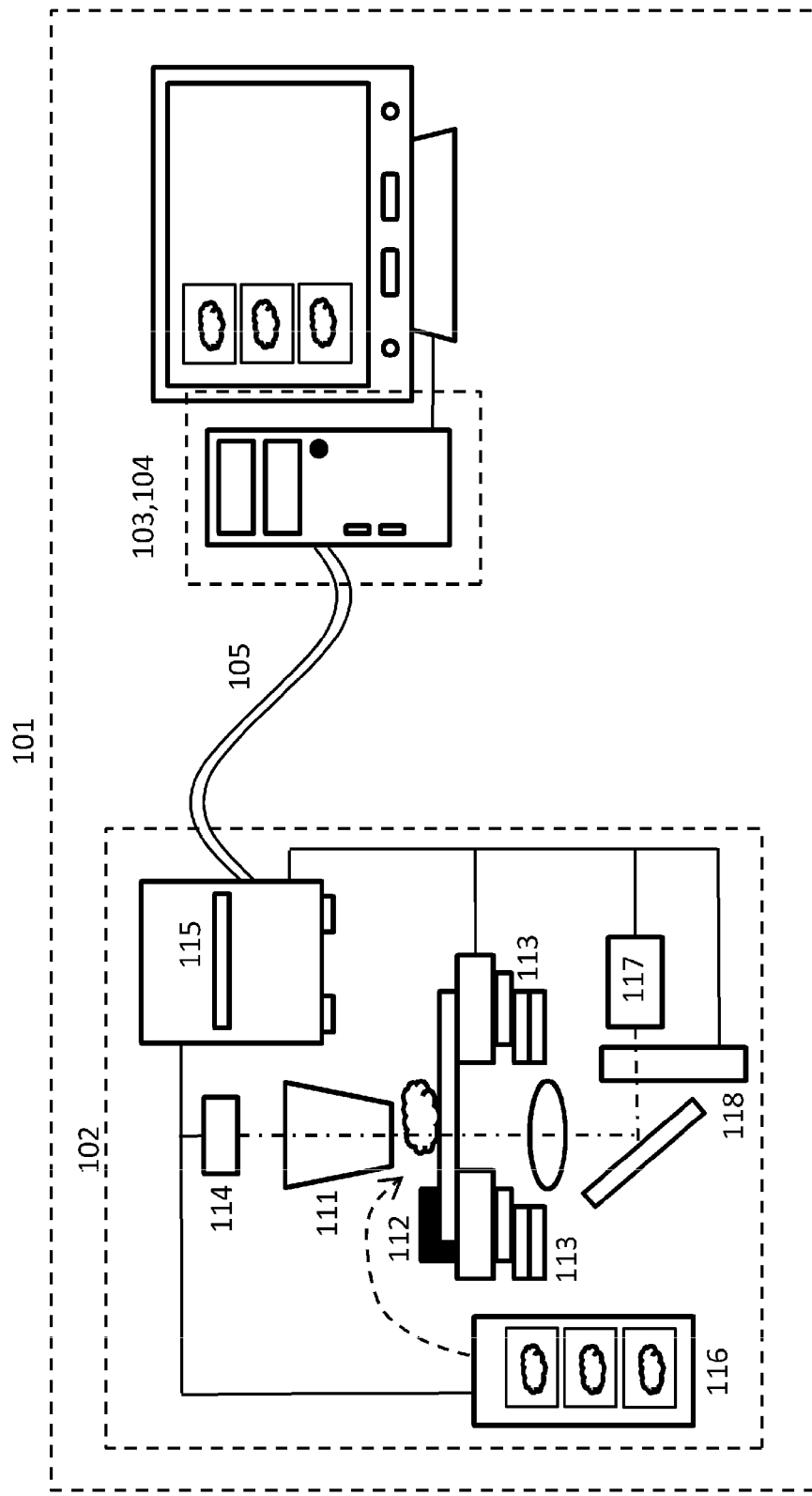
FIG. 2 is a configuration diagram of the microscope imaging system in a first embodiment.

A first embodiment of the present invention is explained with reference to FIG. 2. A microscope imaging system 101 in the first embodiment is configured from an imaging apparatus 102 and an image processing apparatus 103. The microscope imaging system 101 is a system that images a microscope image of a slide (referred to as specimen) on which a sample such as a tissue piece or a cell of an internal organ is fixed and generates high-magnification and high-resolution digital image data. The system is used for, for example, finding and diagnosis of a lesion in pathological diagnosis.

The imaging apparatus 102 includes an objective lens 111, a specimen retaining unit 112, a three-axis stage 113, an image sensor 114, an imaging processing board 115, a specimen selecting unit 116, a halogen lamp 117, and an electric filter wheel 118. An illumination unit for illuminating a specimen is configured by the halogen lamp 117 (a light source), the electric filter wheel 118 (a color filter), and an illumination optical system (a mirror, a lens, etc.). Six kinds of color filters can be mounted on the electric filter wheel 118. In normal imaging, three kinds of color filters RGB are used. The objective lens 111 is an imaging optical system that expands a specimen image and forms the specimen image on a light receiving surface of the image sensor 114. The magnification of the objective lens 111 is changeable. The image sensor 114 is an imaging unit that generates image data of a specimen through photoelectric conversion. A one-dimensional or two-dimensional image sensor including a CCD or a CMOS can be used.

The image processing apparatus 103 is an apparatus having a function of performing various kinds of processing such as stitching, color correction, feature extraction, and automatic diagnosis on image data acquired by the imaging apparatus 102 and displaying the image data and extracted information. The image processing apparatus 103 can be configured by a general-purpose computer including a CPU (a processor), a memory, an auxiliary storage device (a hard disk, etc.), an input device (a mouse, a keyboard, a touch panel, etc.), a display device, and a communication device. The function for the processing and the display of the image data is realized by a computer program. The computer is also used as a control apparatus 104 for an entire system operation. The imaging apparatus 102 and the image processing apparatus 103 (the control apparatus 104) are connected by a cable 105 and can bidirectionally transfer data. As the cable 105, a serial cable, a LAN, a WAN (e.g., the Internet), an optical cable, an internal bus, and the like can be used. The imaging apparatus 102 and the image processing apparatus 103 may be connected by radio communication instead of the cable 105.

Figure 3:
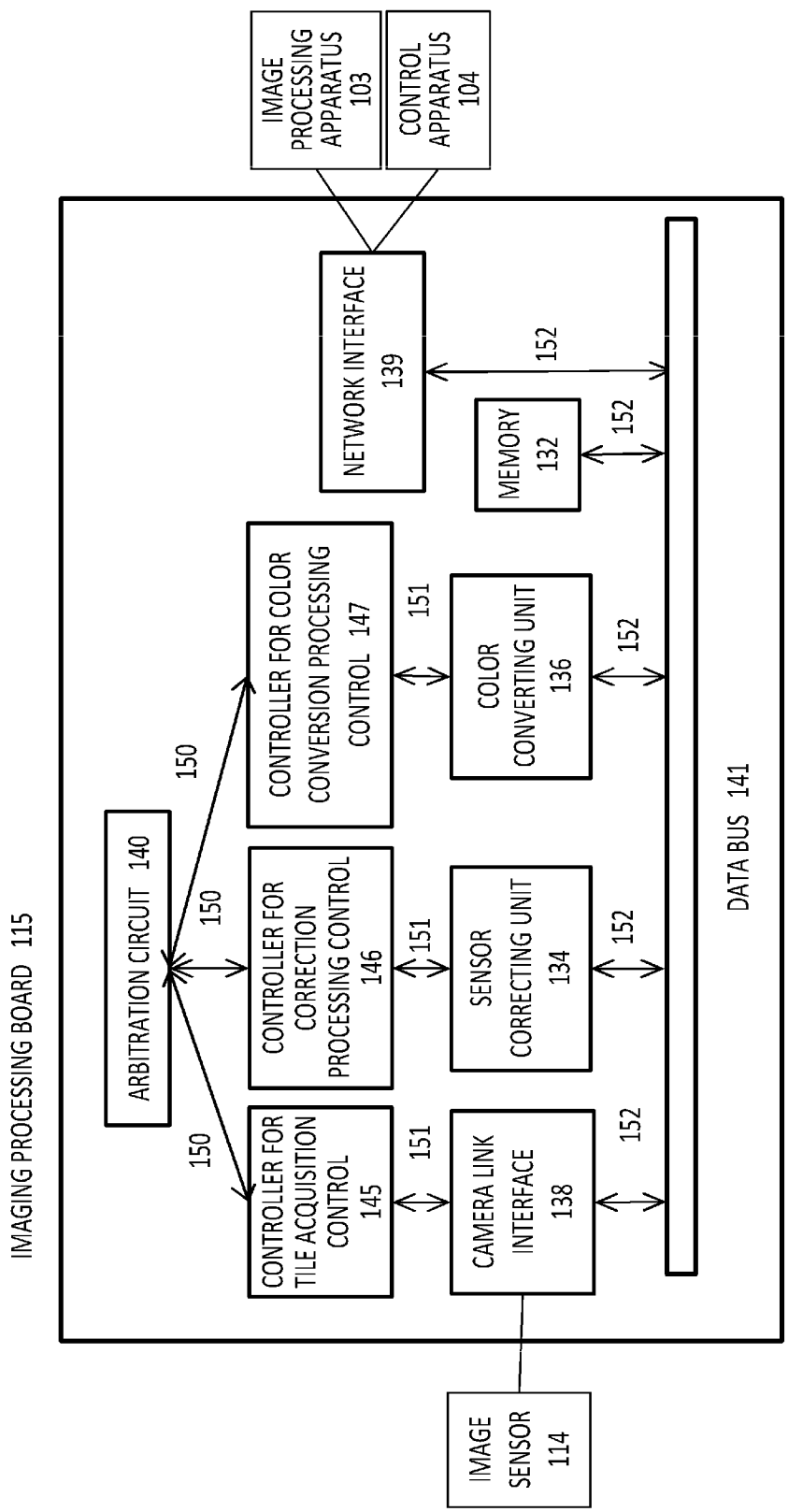
FIG. 3 is a configuration diagram of an imaging processing board in the first embodiment.

The configuration of the imaging processing board 115 of the imaging apparatus 102 is explained with reference to FIG. 3. The imaging processing board 115 includes a memory 132, a sensor correcting unit 134, a color converting unit 136, a camera link interface 138, and a network interface 139. The imaging processing board 115 includes a controller for tile acquisition control 145, a controller for correction processing control 146, and a controller for color conversion processing control 147. After acquiring signals 150 representing occupation permission of a data bus (hereinafter referred to as data bus occupation permission signal) from an arbitration circuit 140, the controllers send processing start instructions 151 to components connected by the data bus 141 and execute image processing of each of the components. Reference numeral 152 denotes a flow of data.

A flow of imaging in the microscope imaging system 101 is explained. First, a user inserts imaging target specimens into the specimen selecting unit 116. In the specimen selecting unit 116, thumbnail images of specimens are imaged and sent to the control apparatus 104. The user selects a specimen desired to be acquired and an imaging range from the thumbnail images displayed on a display.

<Acquisition of Tiles>

Figure 4:
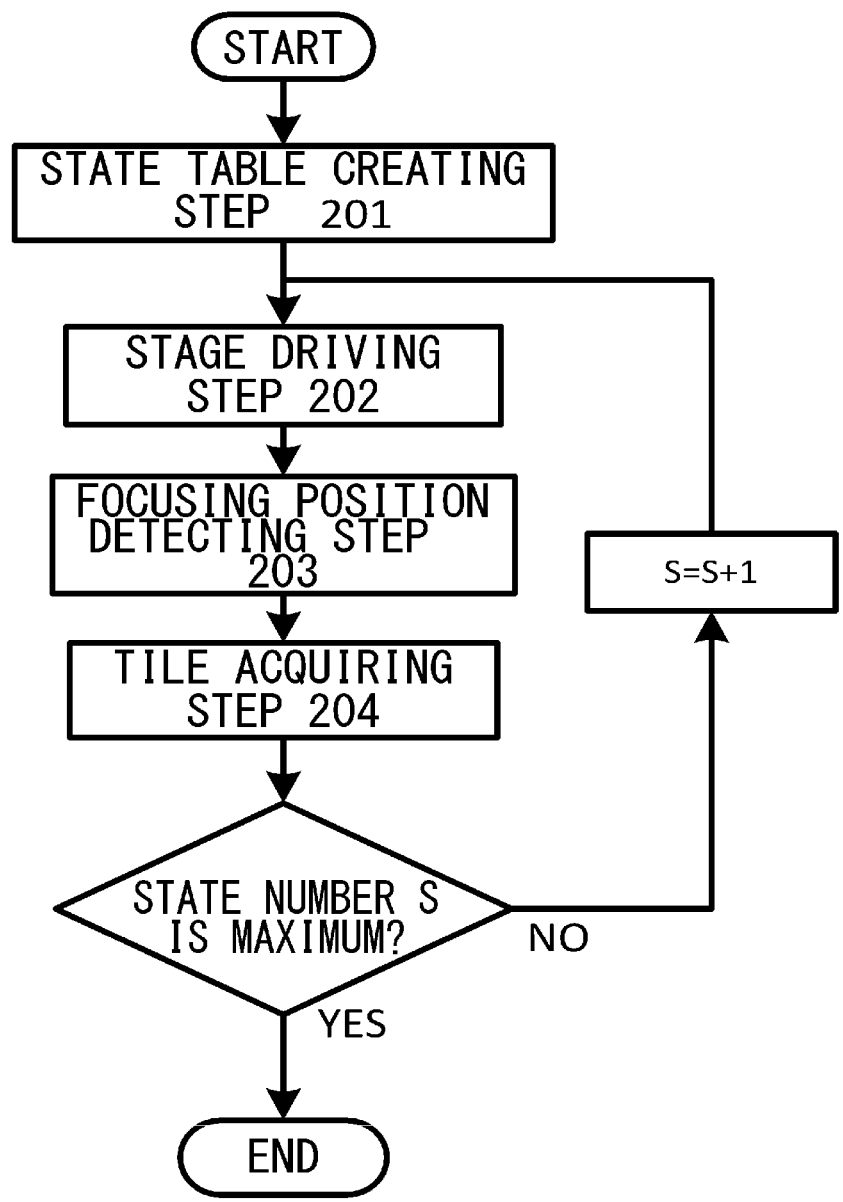
FIG. 4 is a diagram for explaining a flow of acquisition of tiles in the first embodiment.

Subsequently, acquisition of tiles is performed according to a procedure described in FIG. 4. In a state table creating step 201, the control apparatus 104 creates a state table on the basis of a number of the selected specimen and the selected imaging range. The state table is a table in which x, y coordinate values of a three-axis stage from an initial state (a numerical value representing a state is hereinafter referred to as state number and the initial state is set to an initial number 0) to a final state (a state number N) are described. That is, the state numbers 0 to N can also be considered to represent numbers of imaging areas in the case in which an entire imaging range of a specimen is divided into (N+1) imaging areas and the specimen is dividedly imaged. In this DESCRIPTION, a coordinate along two coordinate axes forming a plane perpendicular to an optical axis is set as an x, y coordinate and a coordinate along the optical axis is set as a z coordinate. The x, y coordinates described in the state table do not need to be arranged at an equal interval in fixed order as in raster scan. For example, when a background section not having a tissue structure is present in the imaging range, imaging of the background section is omitted to reduce an imaging time. Alternatively, when it is desired to image a region around an already-imaged tile, a position same as the imaged tile is imaged again, stage height is set the same as stage height during the last imaging, and then the imaging is performed from the original position.

In a stage driving step 202, the control apparatus 104 acquires an x, y coordinate value in a state number S (S=0 in the first time) from the state table, sends a driving instruction to a position of the x, y coordinate value to the three-axis stage 113, and drives the stage.

In a focusing position detecting step 203, the control apparatus 104 performs focusing position detection after the end of the stage driving. First, the control apparatus 104 sends an instruction for acquiring tiles while driving the three-axis stage 113 in the z-coordinate axis direction by a small distance to the three-axis stage 113 and the image sensor 114, changes a focusing position in the z direction, and acquires a plurality of tiles. In the following explanation, image data having different heights (depths) in a specimen like the tiles is referred to as layers. In center portions of the layers, a publicly-known focus algorithm such as normalized variance is applied to calculate a stage height for giving best focusing (referred to as focusing z coordinate value (focus position along z axis)).

In a tile acquiring step 204, the control apparatus 104 drives the three-axis stage 113 to the obtained height of the focus position along z axis and switches a color filter with the electric filter wheel 118 to acquire tiles corresponding to RGB colors (hereinafter referred to as "single color tiles") in order. The single color tiles are stored in the memory 132 of the imaging processing board 115.

Subsequently, the control apparatus 104 repeats the stage driving step 202, the focusing position detecting step 203, and the tile acquiring step 204 while increasing the state number S by 1 at a time and acquires single color tiles corresponding to all state numbers.

<Image Processing Performed in the Imaging Apparatus (Data Exchange Performed Among Constituent Elements)>

Image processing in the imaging apparatus is executed while data exchange is performed among a plurality of constituent elements. First, the data exchange performed among the constituent elements is explained with reference to FIGS. 5, 6, and 7. Thereafter, image processing executed in constituent elements that perform processing (hereinafter referred to as individual processing) is explained.

The order of the data exchange performed among the constituent elements is managed using an imaging state management table 301. The imaging state management table 301 is an array allocated to the memory 132 of the imaging processing board. Indexes of the imaging state management table 301 corresponds to the acquisition order of the single color tiles (hereinafter referred to as single color tile numbers). A value of the imaging state management table 301 is a numerical value corresponding to an imaging state.

Figure 8:
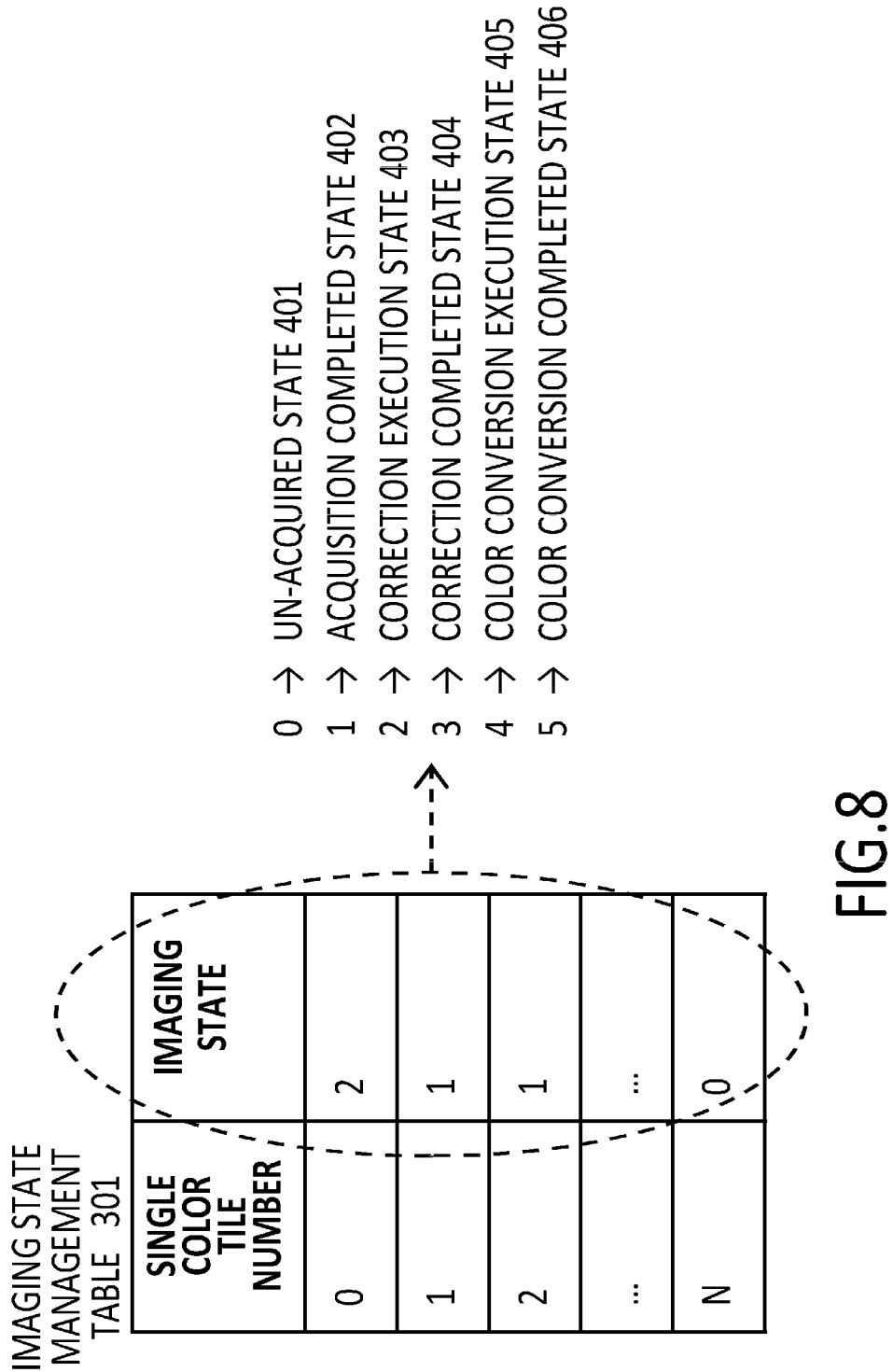
FIG. 8 is a diagram for explaining an imaging state management table in the first embodiment.

The imaging state is explained with reference to FIG. 8. The imaging state value takes 0 to 5. The values respectively represent an un-acquired state 401, an acquisition completed state 402, a correction execution state 403, a correction completed state 404, a color conversion execution state 405, and a color conversion completed state 406. The un-acquired state 401 is a state in which the single color tiles are not acquired yet. The acquisition completed state 402 is a state in which the single color tiles are acquired but sensor correction processing 501 explained below is not performed on the single color tiles. The correction execution state 403 is a state in which the sensor correction processing 501 explained below is being executed on the single color tiles. The correction completed state 404 is a state in which the execution of the sensor correction processing 501 explained below is completed. The color conversion execution state 405 is a state in which color conversion processing explained below is being executed. The color conversion completed state 406 is a state in which the execution of the color conversion processing explained below is completed.

In the following explanation, setting of imaging state values corresponding to the single color tile numbers in the imaging state management table 301 is referred to as "update" of the imaging state management table. Readout of the imaging state values corresponding to the single color tile numbers is referred to as "retrieval". While the update, the retrieval, and a combined procedure of the update and the retrieval (conditional update corresponding to a retrieval result, etc.) are executed, arbitration by the arbitration circuit 140 is performed to prevent interruption by other processes. Retrieving from the imaging state management table 301 performed at a fixed time interval until a specific value is obtained for a specific index or staying on standby until notification of the specific value is received from other processes is referred to as "monitoring" of the imaging state management table 301.

Figure 5:
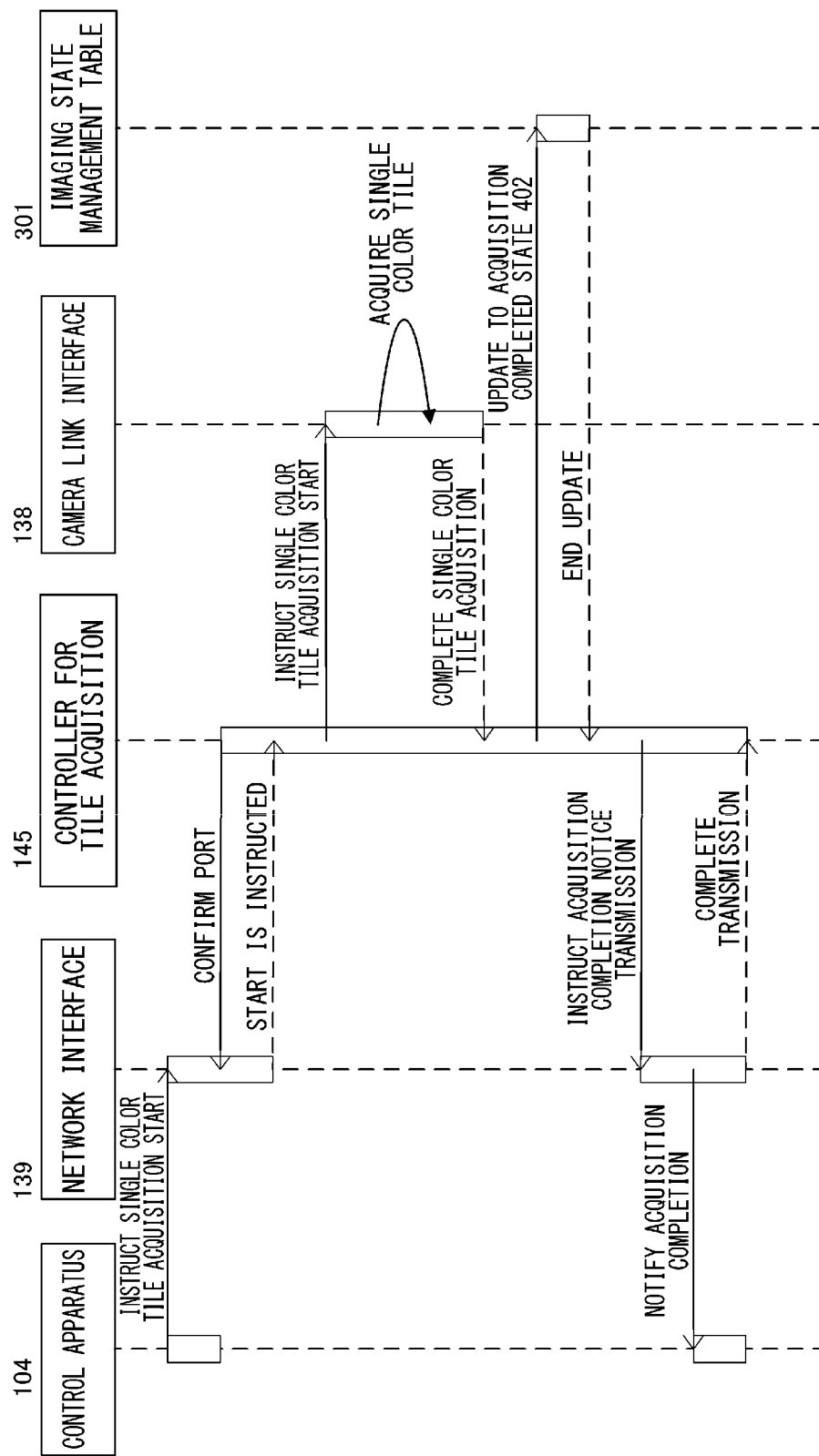
FIG. 5 is a sequence chart of image acquisition processing in the first embodiment.

First, as shown in FIG. 5, the control apparatus 104 sends an acquisition start instruction for a single color tile to the imaging processing board 115. After confirming that the acquisition start instruction arrives at a specific port of the network interface 139, the controller for tile acquisition control 145 instructs, via the camera link interface 138, the image sensor to start acquisition. After acquiring image data (a single color tile), the controller 145 stores the image data in the memory 132. After storing the image data, the controller 145 updates the values of the imaging state management table 301 to the acquisition completed state 402.

Figure 6:
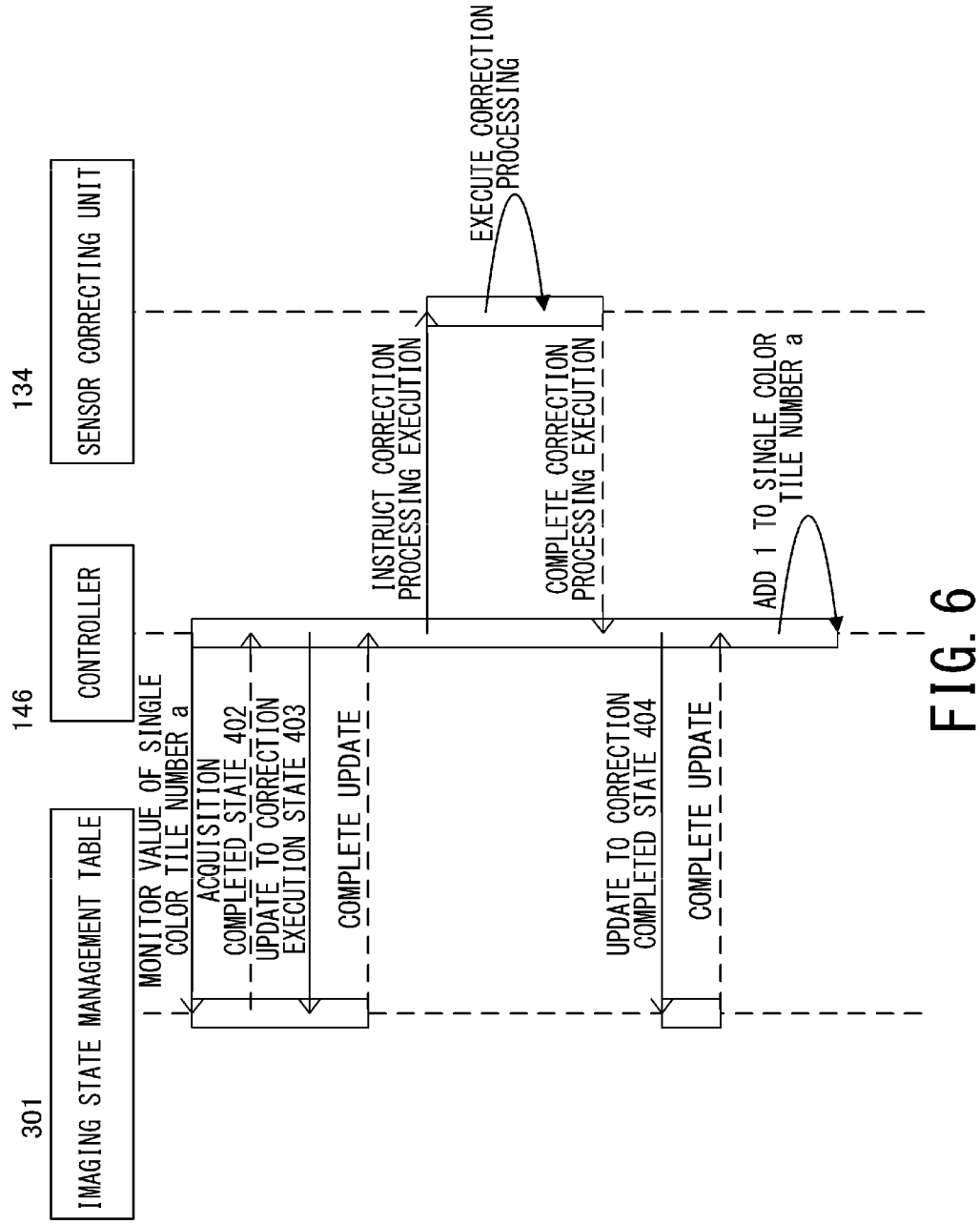
FIG. 6 is a sequence chart of image correction processing in the first embodiment.

On the other hand, as shown in FIG. 6, the controller for correction processing control 146 starts monitoring of the imaging state management table 301 for a single color tile number a (a=0 in the first time) simultaneously with the tile acquisition start. After confirming that the values of the imaging state management table 301 is the acquisition completed state 402, the controller 146 updates the value to the correction execution state 403. Thereafter, the controller 146 sends a top address of the single color tile to the sensor correcting unit 134 and instructs execution of the sensor correction processing 501 explained below. After the sensor correction processing, the controller 146 updates the values of the imaging state management table 301 to the correction completed state 404, increases a single color tile number set as a monitoring target by 1, and continues the monitoring.

Figure 7:
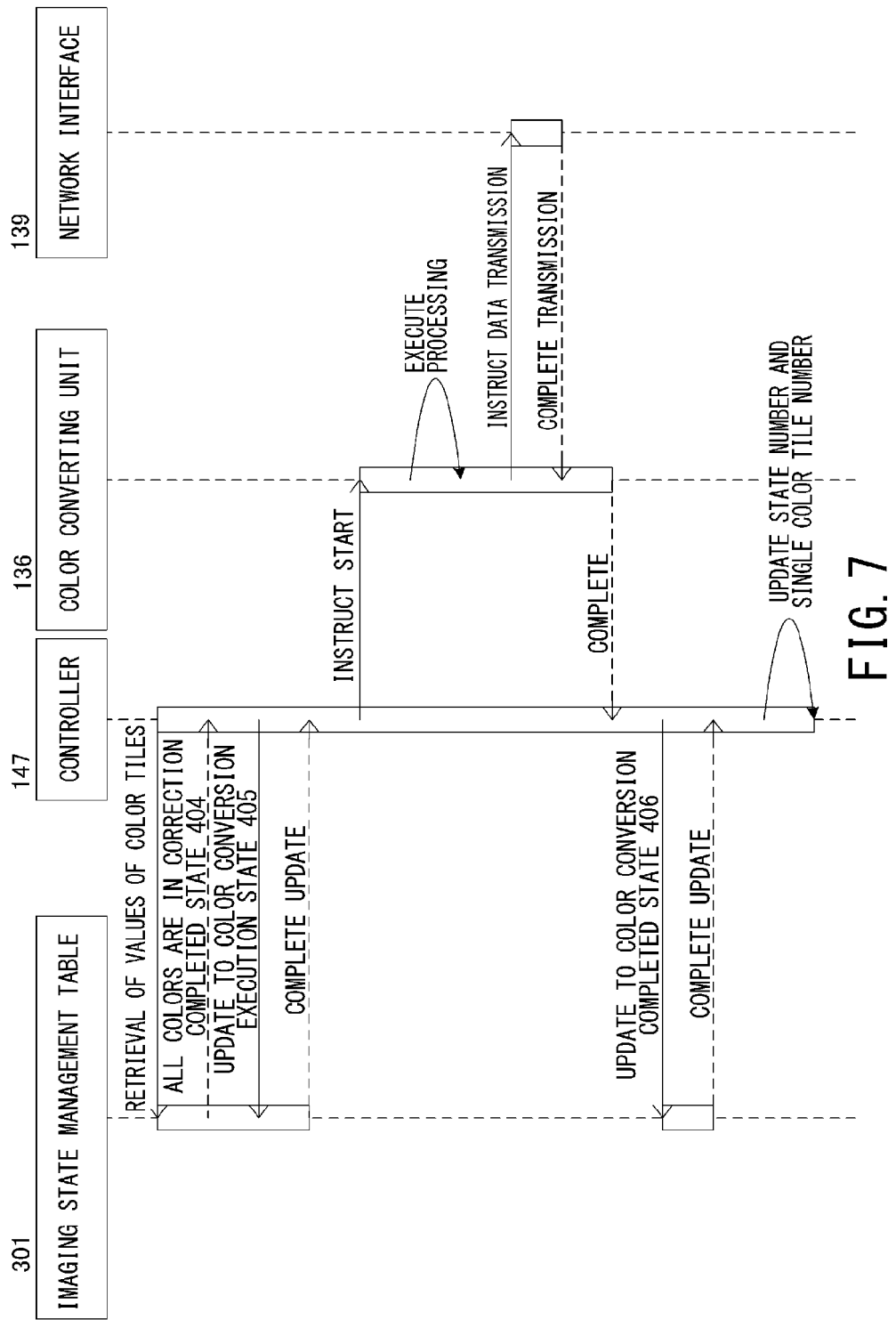
FIG. 7 is a sequence chart of color conversion processing in the first embodiment.

As shown in FIG. 7, after confirming that the values of the imaging state management table 301 for the post-sensor correction single color tile belonging to the same state number is in the correction completed state 404, the controller for color conversion processing 147 updates the value to the color conversion execution state 405. In this embodiment, since imaging of three colors of RGB is performed, three post-sensor correction single color tiles are present for the same state number (the same xy position). The controller 147 sends top addresses of the post-sensor correction single color tiles to the color converting unit 136 and executes the color conversion processing. Output data of the color converting unit 136 (hereinafter referred to as post-color conversion tile) is transferred to the image processing apparatus 103 through the network interface 139. After the transfer, the controller 147 updates the values of the imaging state management table 301 to the color conversion completed state 406 with respect to a single color tile number belonging to the same state number, increases the single color tile number set as the monitoring target by 3, and continues the monitoring.

After the image processing for a single color tile of the state number N ends, the controller 147 resets the value of the imaging state management table 301 to the un-acquired state 401. The image processing in the imaging apparatus ends.

<Image Processing (Individual Processing) Performed in the Imaging Apparatus>

The individual processing is explained.

Figure 9:
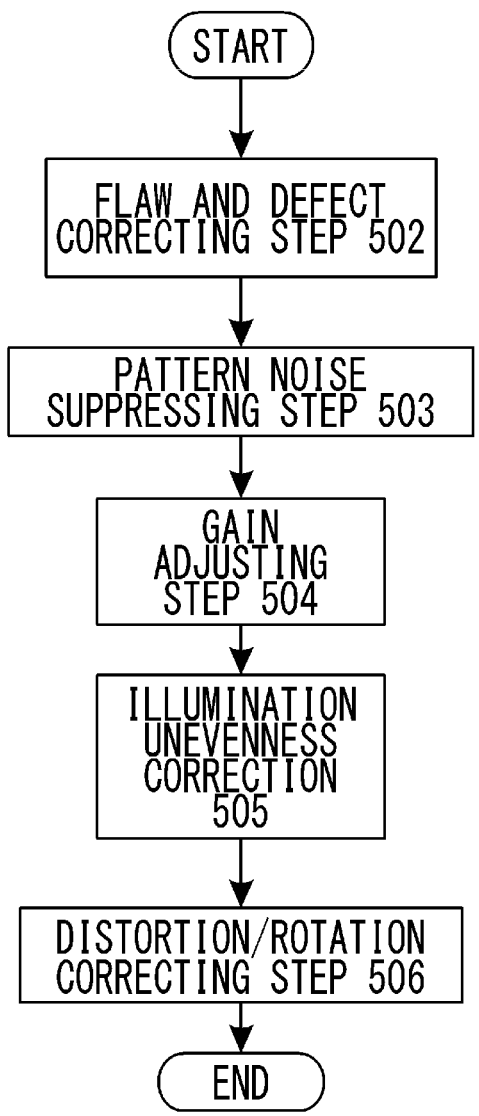
FIG. 9 is a diagram for explaining sensor correction processing in the first embodiment.

The sensor correction processing 501 by the sensor correcting unit 134 is explained with reference to a flowchart of in FIG. 9. A flaw and defect correcting step 502, a pattern noise suppressing step 503, a gain adjusting step 504, an illumination unevenness correcting step 505, and a distortion/rotation correcting step 506 are carried out in this order on single color tile data read out from the memory 132. Output values are recorded on the memory 132. The steps are performed in general image processing and well known. Therefore, explanation of the steps is omitted.

The color conversion processing by the color converting unit 136 is explained. In the color conversion processing, the color converting unit 136 performs a linear operation given by Expression 1 on pixel values of post-sensor correction single color tiles of respective colors to thereby calculate pixel values equivalent to the primary three colors of RGB (hereinafter referred to as RGB values).

[Math. 1]

$$\begin{pmatrix} R \\ G \\ B \end{pmatrix} = \begin{bmatrix} a_{11} & a_{12} & a_{13} \\ a_{21} & a_{22} & a_{23} \\ a_{31} & a_{32} & a_{33} \end{bmatrix} \cdot \begin{pmatrix} P_1 \\ P_2 \\ P_3 \end{pmatrix}$$ (Expression 1)

In Expression 1, $P_1$ to $P_3$ are pixel values obtained in the same position and $a_{11}$ to $a_{33}$ are coefficients of a color correction matrix in three single color tiles after sensor correction belonging to the same state number. The coefficients of the color correction matrix are given beforehand according to a color balance and spectral transmittance of a color filter.

Data configured from the RGB values is an output (post-color conversion processing tiles).

<Functional Blocks of the Image Processing Apparatus>

According to the procedure, a plurality of tiles (partial image data) for one specimen are acquired in the imaging apparatus 102. These data are sequentially transferred to the image processing apparatus 103. In the image processing apparatus 103, stitching of the tiles is performed and image data of the entire specimen is generated. At this point, if tile data is sent to the image processing apparatus 103 exactly in stitching order and acquisition timing of the tile data is determined in advance, it is easy to optimize the order and parallel processing of stitching processing according to the stitching order and the acquisition timing. However, actually, on the imaging apparatus 102 side, imaging order of tiles is determined with priority given to imaging efficiency and imaging quality and imaging of a tile of only a background section not including a sample is skipped. Therefore, the tile data is not always acquired in the stitching order. It is likely that the acquisition timing of the tile data changes because of fluctuation in a processing load or a data transfer load of the imaging apparatus 102. Therefore, the image processing apparatus 103 in this embodiment performs contrivance for realizing efficiency and parallel processing of the stitching processing as much as possible under the premise that the acquisition order and the acquisition timing of the tile data are undecided (unpredictable).

Figure 1:
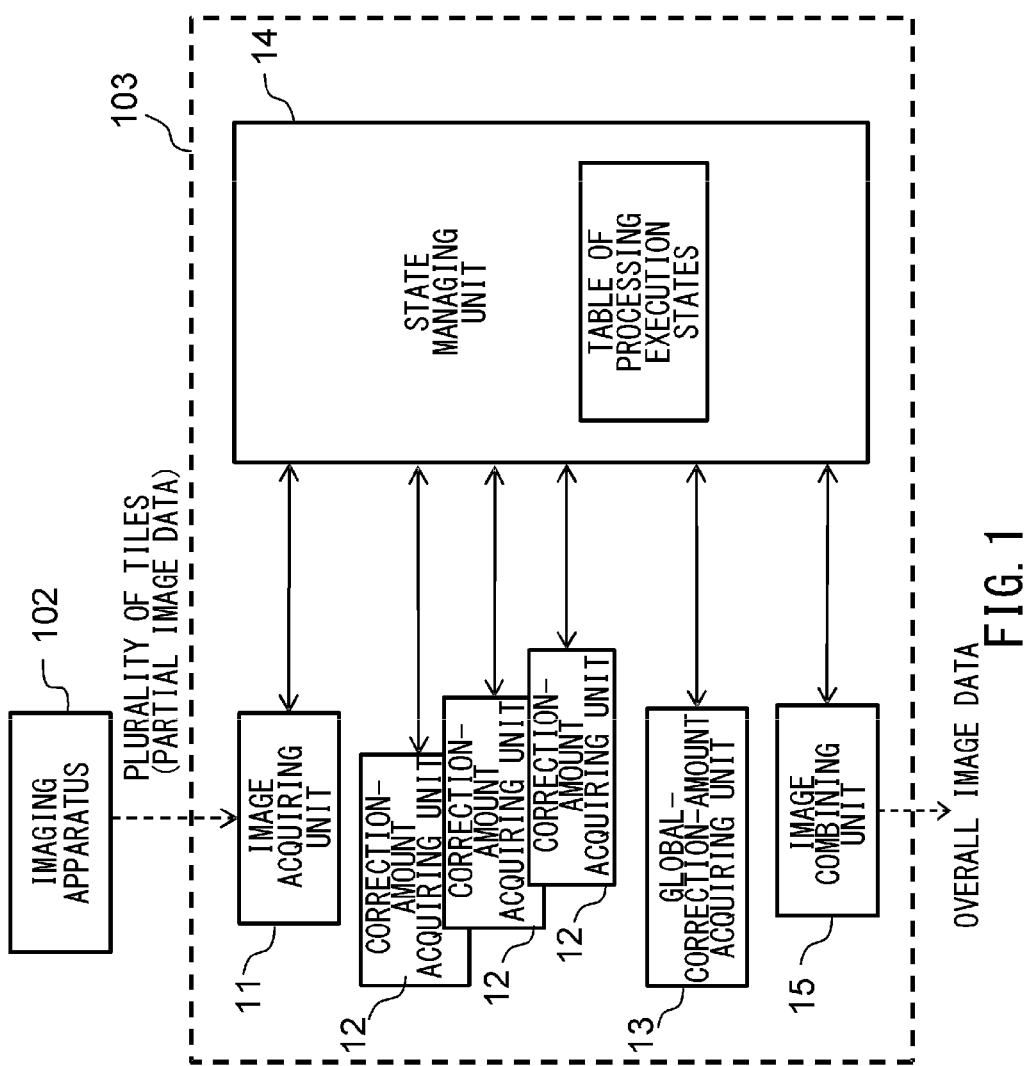
FIG. 1 is a block diagram of functions related to tile stitching processing of a microscope imaging system.

FIG. 1 is a block diagram of functions related to the tile stitching processing of the image processing apparatus 103. Each of functional blocks shown in FIG. 1 is realized by the CPU of the image processing apparatus 103 (the computer) executing a program.

The image processing apparatus 103 includes, as the functions related to the tile stitching processing, an image acquiring unit 11, a plurality of correction-amount acquiring units 12, a global-correction-amount acquiring unit 13, a state managing unit 14, and an image combining unit 15. The image acquiring unit 11 is a function for sequentially acquiring tile data (partial image data) from an external apparatus such as the imaging apparatus 102 or an image server. The acquired tile data is stored in the memory or the auxiliary storage device in the image processing apparatus 103.

The correction-amount acquiring unit 12 is a function of calculating a correction amount for correcting local (relative) deviation between adjacent two tiles (hereinafter referred to as local alignment processing). For example, a certain degree of a calculation time is required for the local alignment processing and calculations for upper, lower, left, and right four tiles adjacent to one tile are necessary. Therefore, in this embodiment, parallel processing by the plurality of correction-amount acquiring units 12 is performed. The correction-amount acquiring units 12 are capable of calculating a correction amount for positional deviation/deformation between any adjacent two tiles independently (in parallel). The plurality of correction-amount acquiring units 12 may be separate processes operating on one processor or may be processes respectively operating on a plurality of processors.

The global-correction-amount acquiring unit 13 is a function of determining, on the basis of the relative positional deviation/deformation amount between the adjacent two tiles calculated by the plurality of correction-amount acquiring units 12, parameters (correction amounts) for geometrical correction actually performed on the tiles (hereinafter referred to as global alignment processing). The image combining unit 15 is a function of performing deformation correction processing on tile data using the correction parameters determined by the global alignment processing and stitching the tile data after the correction to generate overall image data.

The state managing unit 14 is a function of managing state information indicating execution states of the processing for the tiles. The state managing unit 14 includes a table that retains processing execution states for tiles and an interface (a function) that returns values of the table on the basis of requests from the other processes (the correction-amount acquiring unit 12, the image combining unit 15, etc.) and updates the values. The state managing unit 14 manages acquisition states (un-acquired/acquired) of tile data, states (unexecuted/being executed/completed) of the local alignment processing, states (unexecuted/being executed/completed) of the global alignment processing, states (being executed/completed) of the deformation correction processing, and the like.

In the image processing apparatus 103, the processes inquire the state managing unit 14 about processing execution states of the tiles. The local alignment processing by any one of the correction-amount acquiring units 12 is started in order from a set of adjacent tiles, data of which is prepared. At this point, to prevent the other correction-amount acquiring units 12 from redundantly performing processing on a set of adjacent tiles being processed or already processed, exclusive control (lock control) among the correction-amount acquiring units 12 is performed by the state managing unit 14. Such a mechanism makes it possible to efficiently execute, irrespective of acquisition order and acquisition timing of a plurality of tiles, the stitching processing of the tiles.

A specific example of a flow of processing for realizing the functions shown in FIG. 1 is explained below.

<Image Processing Performed in the Image Processing Apparatus (Data Exchange Performed Among Constituent Elements)>

Image processing performed in the image processing apparatus 103 is also executed while data exchange is performed among a plurality of constituent elements (a plurality of processes executed by a program and tables for state management allocated to a shared memory). As in the explanation of the image processing in the imaging apparatus, the data exchange is explained with reference to FIGS. 10, 11, and 12. Then, individual processing executed in the constituent elements is explained.

In a main memory of the image processing apparatus 103, a shared memory region, which different processes can access, is secured. Four arrays and one variable used for management of a plurality of processes are allocated to the shared memory region. The arrays and the variable are generated, retained, and managed by the state managing unit 14 shown in FIG. 1.

Figure 13:
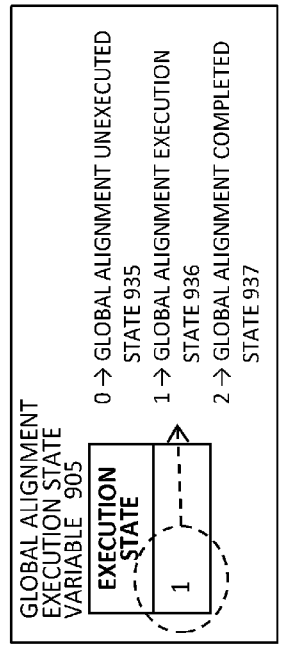
FIGS. 13A to 13D are examples of arrays and a variable used in management of a processing execution state in the first embodiment.

The arrays and the variable and state information represented by the arrays and the variable are explained with reference to FIG. 13A to FIG. 13D. A first array shown in FIG. 13A is an array for managing an execution state of image processing in tiles (hereinafter referred to as image processing execution state) and hereinafter referred to as process management table 901. Second and third arrays shown in FIG. 13B are arrays for managing states concerning the local alignment processing in an execution state of stitching processing (hereinafter referred to as stitching processing execution state) and hereinafter referred to as alignment management tables 902 and 903. The local alignment processing is processing for calculating, by analyzing data of an overlapping segment of adjacent two tiles, local deviation of the two tiles, that is, a positional deviation/deformation amount of the other tile obtained when one tile is set as a reference. Details of the local alignment processing are explained below. A fourth array shown in FIG. 13C is an array used for a state number retrieval of adjacent tiles and hereinafter referred to as state number link table 904. A variable shown in FIG. 13D is a variable for managing a state concerning the global alignment processing in a stitching processing execution state and hereinafter referred to as global alignment execution state variable 905. The global alignment processing is processing for calculating, on the basis of the relative positional deviation/deformation between the two tiles obtained by the local alignment processing, a positional deviation/deformation amount given to the tiles. Details of the global alignment processing are explained below.

Indexes of the process management table 901, the alignment management table 902, and the alignment management table 903 are state numbers. In FIG. 13A and FIG. 13B, only items related to the execution state management are described. However, for example, imaging information and the like corresponding to the state numbers may be added to the table to make it possible to retrieve the imaging information and the like simultaneously with an execution state.

The image processing execution state managed by the process management table 901 is explained. An image processing execution state value takes 0 to 3. The values respectively represent an un-acquired state 921, a tile received state 923, a deformation correction execution state 942, and a deformation correction completed state 943. The un-acquired state 921 is a state in which data acquisition of tiles and storage in a memory are not completed. The tile received state 923 is a state in which the data acquisition of the tiles is completed. The deformation correction execution state 942 is a state in which deformation correction amount processing explained below is being executed. The deformation correction completed state 943 is a state in which the execution of the deformation correction is completed.

The stitching processing execution state managed by the alignment management tables 902 and 903 is explained. A stitching processing execution state value takes 0 to 3. The values respectively represent a local alignment unexecuted state 930, a local alignment unexecutable state 931, a local alignment execution state 932, and a local alignment completed state 933. The local alignment unexecuted state 930 is a state in which the local alignment processing is not executed. The local alignment unexecutable state 931 is a state in which the local alignment processing cannot be executed because, for example, adjacent tiles are absent. The local alignment execution state 932 is a state in which the local alignment processing is being executed. The local alignment completed state 933 is a state in which the execution of the local alignment processing is completed.

The global alignment execution state variable 905 takes execution state values of 0 to 2. The execution state values respectively represent a global alignment unexecuted state 935, a global alignment execution state 936, and a global alignment completed state 937. The global alignment unexecuted state 935 is a state in which the global alignment processing is not executed. The global alignment execution state 936 is a state in which the global alignment processing is being executed. The global alignment completed state 937 is a state in which the execution of the global alignment processing is completed.

A value of the process management table 901 represents the image processing execution state of a tile with respect to an index (a state number). An initial value is the un-acquired state 921. A value of the alignment management table 902 represents an execution state of local alignment performed between an adjacent tile present above a tile corresponding to the index and the tile corresponding to the state number. A value of the alignment management table 903 represents an execution state of local alignment performed between an adjacent tile present on the left of the tile corresponding to the index and the tile corresponding to the state number. Initial values of the alignment management tables 902 and 903 are the local alignment unexecuted state 930 or the local alignment unexecutable state 931). The image processing execution state is set to the local alignment unexecutable state 931 when adjacent tiles are absent or acquisition of adjacent tiles is omitted to reduce the number of times of imaging.

Operation same as the operation for the imaging state management table 301 (the update, the retrieval, and the combined procedure of the update and the retrieval) can be executed on the process management table 901. Two kinds of operation related to the execution of the local alignment processing (hereinafter referred to as stitching state retrieval and stitching state update) can be executed on the process management table 901 and the alignment management tables 902 and 903. The state managing unit 14 performs exclusion control (lock control) such that, while these kinds of operation are performed by a certain process, the other processes cannot access the tables.

An index of the state number link table 904 is a state number. A value of the state number link table 904 is a vector having, as four elements, state numbers of tiles located above and below and on the left and right of a tile equivalent to the index.

The global alignment execution state variable 905 is a variable that retains an execution state of global alignment. An initial value is the global alignment unexecuted state 935.

A plurality of processes related to the tile stitching processing can be classified into three types according to processing executed in the inside. The respective processes are hereinafter referred to as data receiving process, positional deviation/deformation amount acquiring process, and image combining process. The data receiving process corresponds to the image acquiring unit 11 shown in FIG. 1, the positional deviation/deformation amount acquiring process corresponds to the correction-amount acquiring unit 12, and the image combining process corresponds to the image combining unit 15. Depending on hardware resources of the image processing apparatus 103, it is also possible to increase the number of processes of the respective types and speed up the processing. For example, in FIG. 1, the number of the positional deviation/deformation amount acquiring processes (the correction-amount acquiring units 12) is three. However, it is also possible to further increase the number of the processes and increase the number of the data receiving processes and the image combining processes.

As explained below, in this embodiment, the processes independently monitor state information (the image processing execution state value, the stitching processing execution state value, etc.) to realize a start of the processing at appropriate timing and prohibition of redundant processing. That is, the processes autonomously determine a start and possibility of an operation making use of the state information of the state managing unit 14. However, when the monitoring of the state information by the processes is a bottleneck and processing efficiency is deteriorated, an exclusive process for performing arbitration (scheduling) of the processes may be provided. That is, the exclusive process performs retrieval and monitoring of the image processing execution state value (or the stitching processing execution state value) and issues processing commands to the child processes (the positional deviation/deformation amount acquiring process and the image combining process) on the basis of a retrieval result. Alternatively, the data receiving process may send the processing commands to the child processes immediately after receiving tile data. These configurations are generally known as a producer-consumer design pattern. The child processes executes processing excluding the retrieval and the monitoring of the image processing execution state (or the stitching processing execution state) in the positional deviation/deformation amount acquiring process or the image combining process.

(Data Receiving Process)

Figure 10:
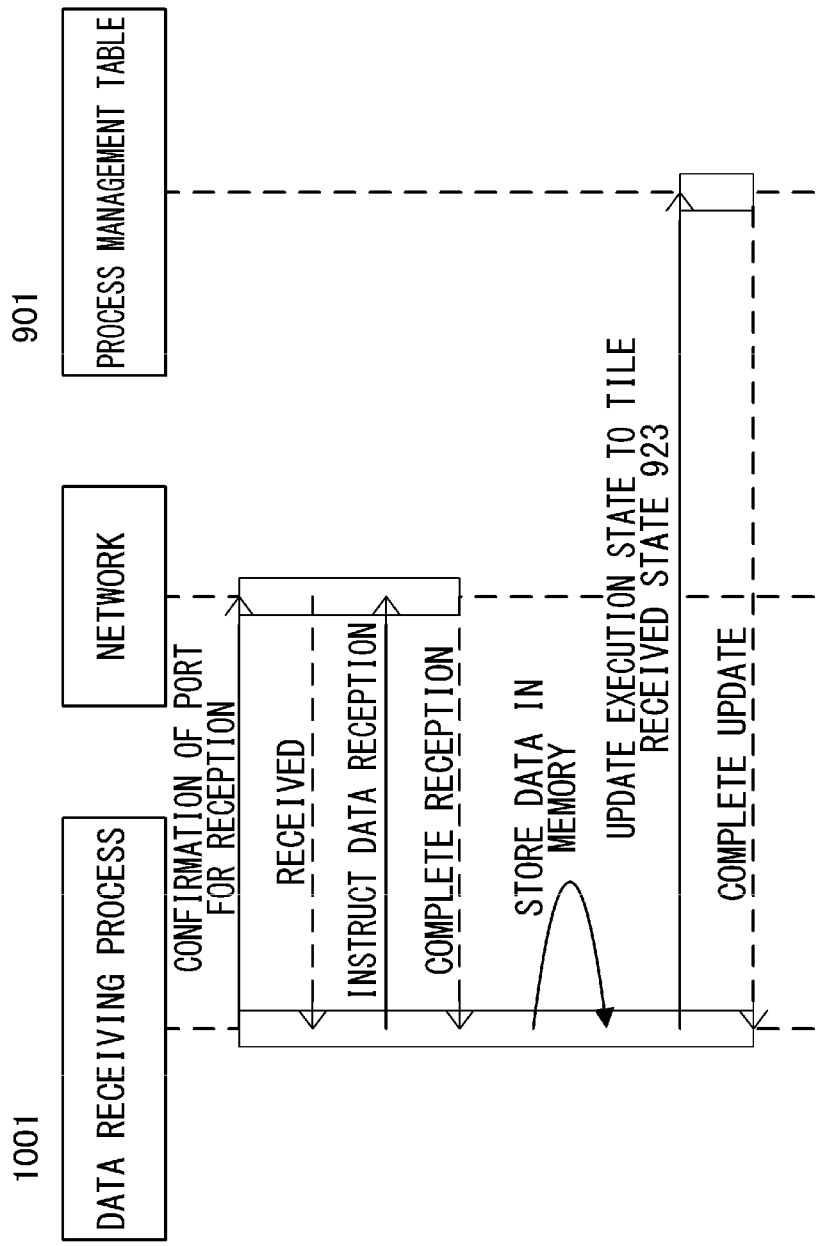
FIG. 10 is a sequence chart of a data receiving process in the first embodiment.

Data exchange performed between a data receiving process 1001 and the components is explained with reference to FIG. 10. The data receiving process 1001 monitors a specific port of a network and waits for transmission of data from the imaging apparatus 102. When receiving data of tiles after color conversion processing from the imaging apparatus 102, the data receiving process 1001 stores the data in the main memory. When the storage of the data is completed, after updating the values of the process management table 901 to the tile received state 923, the data receiving process 1001 returns to the port monitoring state.

(Positional Deviation/Deformation Amount Acquiring Process)

Figure 11:
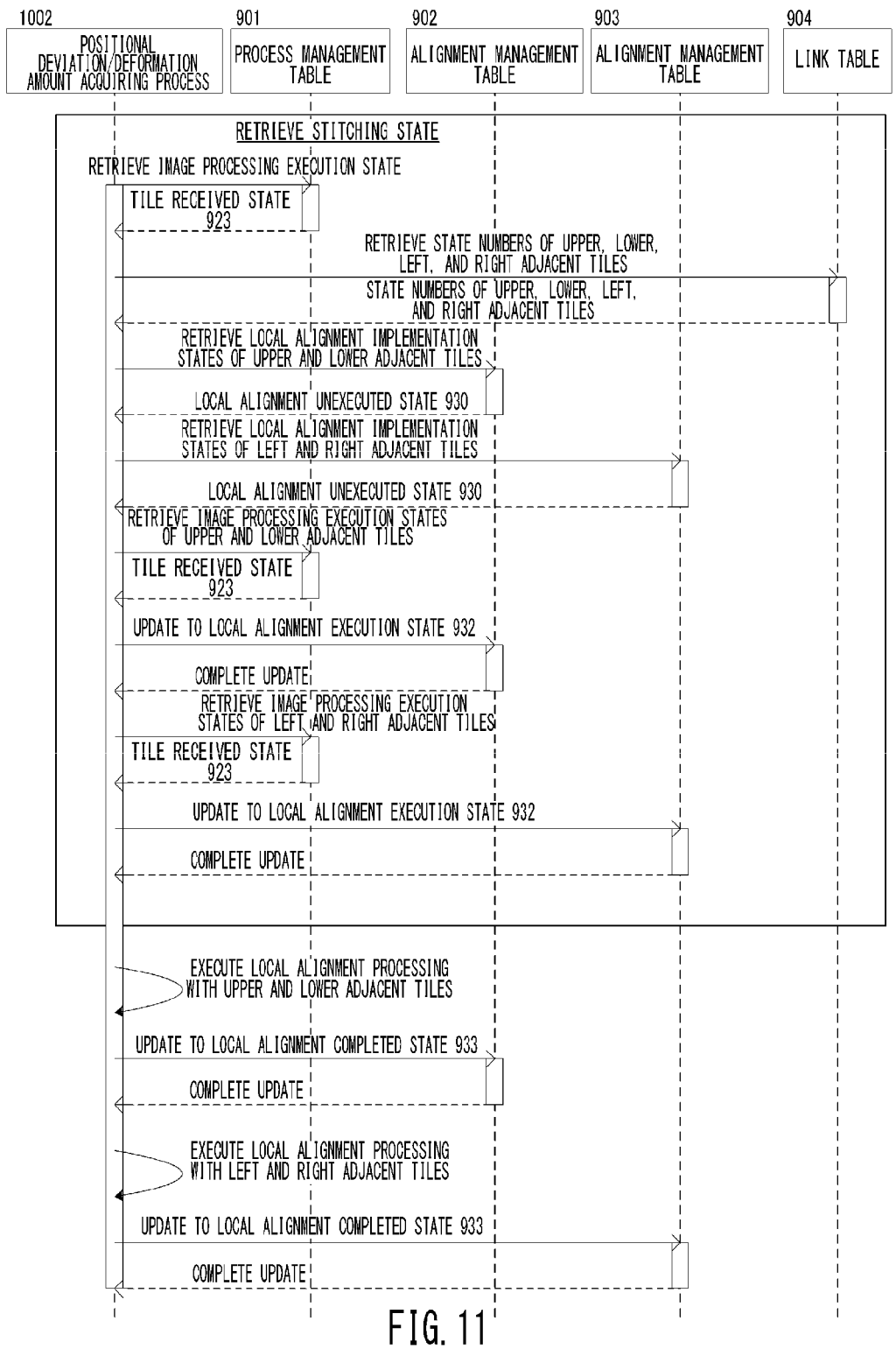
FIG. 11 is a sequence chart of a positional deviation/deformation amount acquiring process in the first embodiment.

Data exchange performed between a positional deviation/deformation amount acquiring process 1002 and the components is explained with reference to FIG. 11. At the start of the execution of the positional deviation/deformation amount acquiring process 1002, a state number set as a processing target (hereinafter referred to as target state number) is initialized to 1 or a predetermined value. The process 1002 monitors an image processing execution state of the target state number into tiles until the image processing execution state changes to the tile received state 923. In this embodiment, a plurality of the positional deviation/deformation amount acquiring processes 1002 are executed in parallel. Therefore, adjustment among the processes is performed such that target state numbers of the processes 1002 do not overlap. For example, a parent process may designate target state numbers respectively monitored by the child processes 1002. The processes 1002 may autonomously set target state numbers not to overlap state numbers being monitored or processed by the other processes 1002. Rather than continuing to monitor one target state number until the image processing execution state changes to the tile received state 923, the processes 1002 may change the target state numbers in order (e.g., increment the target state numbers by 1 at a time) and retrieve the state number, the image processing execution state of which is the tile received state 923. According to such a mechanism, the local alignment processing thereafter is sequentially started from a tile, data of adjacent tiles of which is prepared.

The process 1002 executes stitching state retrieval on the process management table 901 and the alignment management tables 902 and 903. In the stitching state retrieval, the process 1002 retrieves, according to the alignment management tables 902 and 903, implementation states of the local alignment processing between a tile of the target state number and upper, lower, left, and right four tiles adjacent to the tile. The local alignment implementation states of the upper and left tiles adjacent to the tile are directly obtained from the alignment management tables 902 and 903. On the other hand, the local alignment implementation states of the tiles located below and on the right of the tile are obtained using the alignment management tables 902 and 903 after obtaining state numbers of the tiles below and on the right of the tile using the state number link table 904.

When the local alignment implementation state of the adjacent tile is the local alignment unexecuted state 930, the process 1002 acquires an image processing execution state of the adjacent tile using the process management table 901. When the image processing execution state is the tile received state 923, the process 1002 updates the values of the alignment management tables 902 and 903 to the local alignment execution state 932. By changing the values of the tables to the local alignment execution state 932, the tile changes to the lock state. The other processes are prohibited from accessing the tile (exclusive control). The above is the stitching state retrieval.

After the end of the stitching state retrieval, the process 1002 executes the local alignment processing on the adjacent tiles updated to the local alignment execution state 932 and the tile of the target state number. Details of the local alignment processing are explained below.

After the execution of the local alignment processing, the process 1002 executes stitching state update. The stitching state update is operation for updating the values of the alignment management tables 902 and 903. Values corresponding to the adjacent tiles, for which the local alignment is implemented, are updated to the local alignment completed state 933. Consequently, the local alignment processing (processing for acquiring a local correction amount) for the tile of the target state number by the positional deviation/deformation amount acquiring process 1002 (the correction-amount acquiring unit 12) is completed.

The processes 1002 sequentially execute the process on the tiles, data of which are received. The processing for all the tiles of the state numbers 0 to N is executed. After confirming that execution state numbers of all the state numbers 0 to N of the alignment management tables 902 and 903 change to the local alignment completed state 933, the global-correction-amount acquiring unit 13 starts the global alignment processing. Output data of the global alignment processing is parameters for geometrical correction for the tiles and hereinafter referred to as "positional deviation/deformation amount" or simply referred to as "second correction amount". Details of the global alignment processing (processing for determining the second correction amount) are explained below. At the start of the execution, after updating the values of the global alignment execution state variable 905 to the global alignment execution state 936, the global-correction-amount acquiring unit 13 executes the global alignment processing. After the execution, the global-correction-amount acquiring unit 13 updates the values of the global alignment execution state variable 905 to the global alignment completed state 937.

(Image Combining Process)

Figure 12:
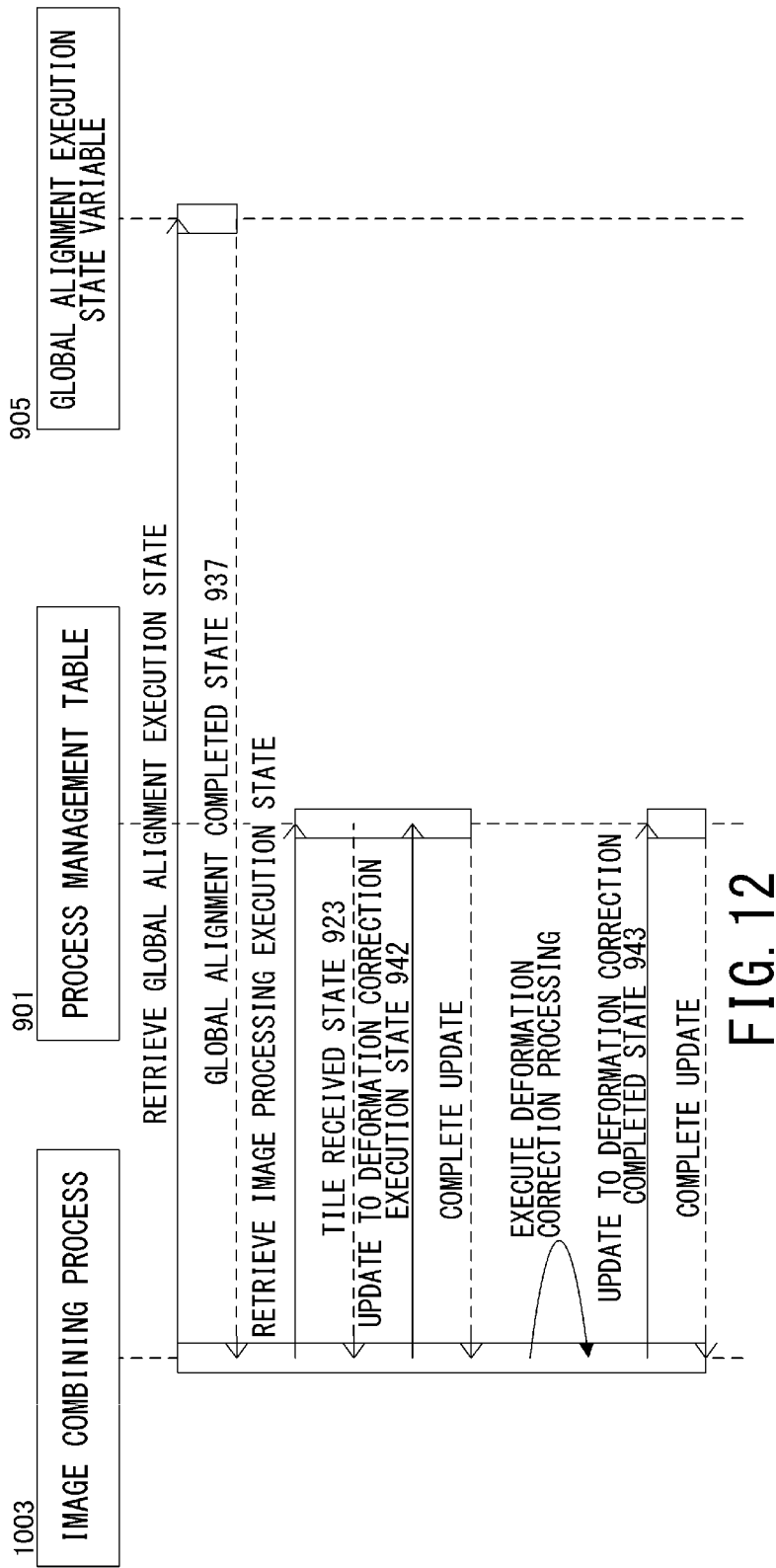
FIG. 12 is a sequence chart of an image combining process in the first embodiment.

Data exchange performed between an image combining process 1003 and the components is explained with reference to FIG. 12. As in the positional deviation/deformation amount acquiring process 1002, the target state number is initialized to 1 or a predetermined value at the start of the process. Thereafter, the image combining process 1003 performs monitoring of the global alignment execution state variable 905 and confirms that a numerical value changes to the global alignment completed state 937. Subsequently, the image combining process 1003 updates the values of the process management table 901 from the tile received state 923 to the deformation correction execution state 942 and performs deformation correction processing explained below on a post-color conversion tile corresponding to the target state number. Outputs of the deformation correction processing are a post-positional deviation/deformation correction tile and image data obtained by reducing or expanding the post-positional deviation/deformation correction tile. The outputs are stored in the main memory of the image processing apparatus 103. After the end of the deformation correction processing, the image combining process 1003 updates the values of the process management table 901 to the deformation correction completed state 943. When the target state number is not N, the image combining process 1003 updates the target state number and returns to the monitoring state of the process management table 901. The numerical value to be updated is the same as the numerical value in the case of the positional deviation/deformation amount acquiring process 1002.

On the other hand, when the target state number is N, after confirming that the values of the process management table 901 corresponding to all the state numbers change to the deformation correction completed state 943, the image combining process 1003 executes image combination processing explained below. As a result of the image combination processing, post-combination image data explained below is obtained. The post-combination image data is stored in the hard disk in the image processing apparatus 103.

Simultaneously with the storage in the hard disk, all the tables and the variables allocated to the shared memory and the state numbers retained by all the processes are initialized, whereby the image processing performed in the image processing apparatus ends.

<Image Processing (Individual Processing) Performed in the Image Processing Apparatus>

Details of respective kinds of image processing performed in the image processing apparatus 103 are explained.

The local alignment processing is processing for calculating, using an overlapping region between adjacent two tiles (hereinafter referred to as overlapping segment data), local (relative) deviation of the two tiles, that is, a positional deviation/deformation amount of the other tile obtained when one tile is set as a reference. The tile set as the reference is hereinafter referred to as "reference tile". The tile not set as the reference is hereinafter referred to as "comparative tile"). When the adjacent tiles are disposed on the left and right, the tile on the left side is set as the reference tile. When the adjacent tiles are disposed vertically, the tile on the upper side is set as the reference tile. The positional deviation/deformation can be represented by affine transformation given by Expression 2.

[Math. 2]

$$x' = M \cdot x + s + t = \begin{bmatrix} m_{11} & m_{12} \\ m_{21} & m_{22} \end{bmatrix} \cdot \begin{pmatrix} x \\ y \end{pmatrix} + \begin{pmatrix} s_1 \\ s_2 \end{pmatrix} + \begin{pmatrix} t_1 \\ t_2 \end{pmatrix} \quad \text{(Expression 2)}$$

In Expression 2, x, y is a coordinate value representing a pixel position in the reference tile, x', y' (in Expression 2, represented by a vector x') is a coordinate value representing a pixel position in the comparative tile, $m_{11}$ to $m_{22}$ are matrix components concerning deformation, $s_1$, $s_2$ is a matrix component concerning positional deviation, and $t_1$, $t_2$ is a center coordinate of the comparative tile at the time when the center of the reference tile is set as the origin.

The local alignment processing is based on a Feature-based registration method. In the Feature-based registration, first, positions having features like corners and straight lines are extracted from overlapping segment data in adjacent two tiles. Subsequently, a positional deviation/deformation amount for minimizing a difference between positions having the same feature belonging to the respective tiles is calculated by a method of least squares.

Figure 14:
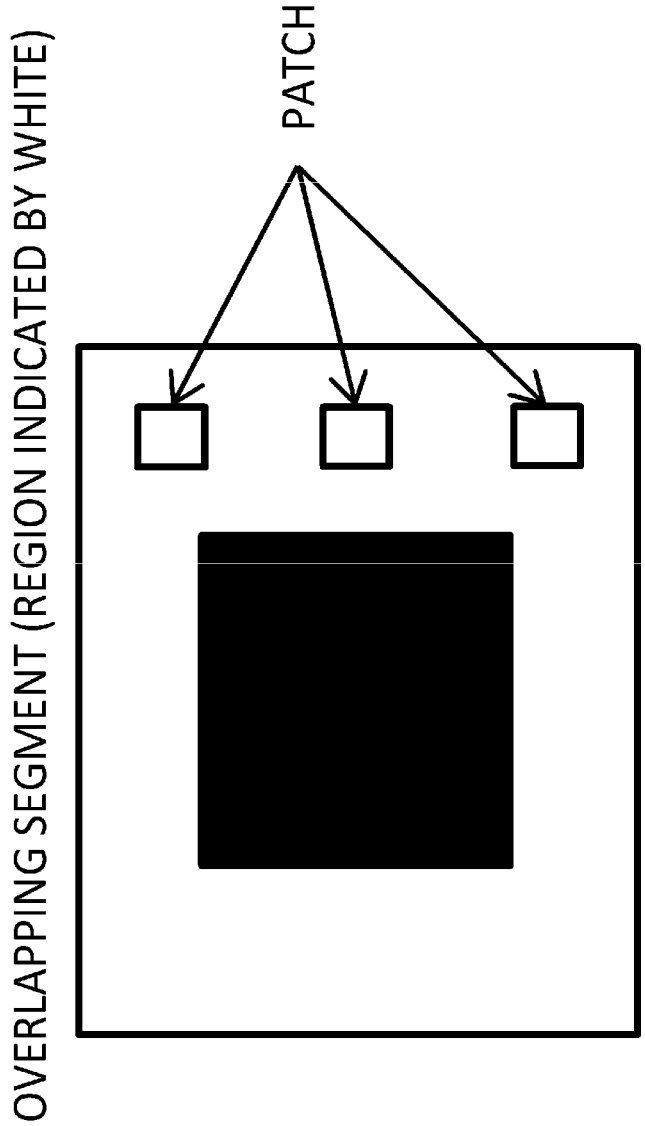
FIG. 14 is a diagram for explaining patches used for alignment in the first embodiment.

However, in a pathological specimen image, which is an imaging target of this embodiment, features suitable for position detection like corners and straight lines are hardly present. In such a case, as shown in FIG. 14, in general, rectangular very small sections (hereinafter referred to as patches) are provided in the overlapping region data and patterns in the patches are used as features. In this embodiment, the Feature-based registration in which the patches are used as features is adopted.

Figure 15A:
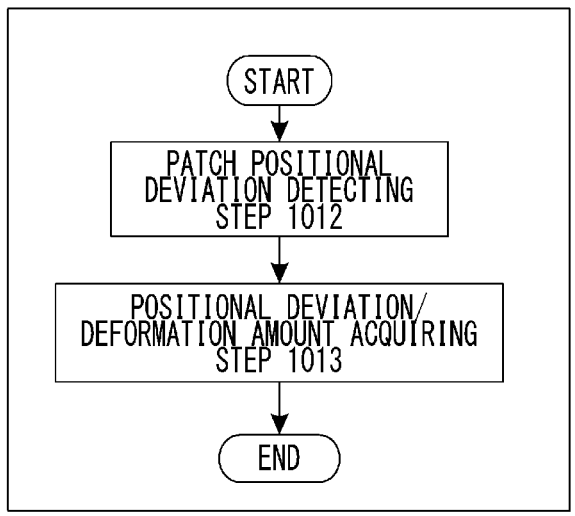
FIGS. 15A to 15D are diagrams for explaining stitching processing in the first embodiment.

A flow of local alignment processing 1011 is explained with reference to a flowchart of FIG. 15A. In a patch positional deviation detecting step 1012, first, a patch is acquired from the overlapping region data of the reference tile. The position of the patch may be arbitrarily selected or may be given beforehand. However, the patch needs to include a finer pattern (a texture). Subsequently, the position of the patch is estimated in the overlapping region data of the comparative tile. The estimated position is obtained by a normalization correlation function given by Expression 3.

[Math. 3]

$$E(u) = \frac{\sum_i (I_0(x_i) - \overline{I_0})(I_1(x_i + u) - \overline{I_1})}{\sqrt{\sum_i (I_0(x_i) - \overline{I_0})^2 (I_1(x_i + u) - \overline{I_1})^2}} \quad \text{(Expression 3)}$$

$$\overline{I_0} = \frac{1}{N} \sum_i I_0(x_i),$$

$$\overline{I_1} = \frac{1}{N} \sum_i I_1(x_i + u)$$

In Expression 3, $I_0(x)$ is a pixel value of a pixel present in a position x of the patch of the reference tile, $I_1(x)$ is a pixel value of a pixel present in the position x in the patch of the comparative tile, i is a number of the pixel in the patch, N is the number of pixels in the patch, and u is a vector representing positional deviation between both the patches. When the normalization correlation function indicates a maximum value, u is used as inter-patch positional deviation.

In a positional deviation/deformation amount acquiring step 1013, a coefficient of a positional deviation/deformation function given by Expression 2 is estimated according to Expression 4.

[Math. 4]

$$\begin{pmatrix} m_{11} \\ m_{12} \\ s_1 \\ m_{21} \\ m_{22} \\ s_2 \end{pmatrix} = G\left(\begin{bmatrix} x_1 & y_1 & 1 & 0 & 0 & 0 \\ 0 & 0 & 0 & x_1 & y_1 & 1 \\ x_2 & y_2 & 1 & 0 & 0 & 0 \\ 0 & 0 & 0 & x_2 & y_2 & 1 \\ & & & \vdots & & \\ x_P & y_P & 1 & 0 & 0 & 0 \\ 0 & 0 & 0 & x_P & y_P & 1 \end{bmatrix}\right) \cdot \begin{pmatrix} x'_1 - t_1 - x_1 \\ y'_1 - t_2 - y_1 \\ x'_2 - t_1 - x_2 \\ y'_2 - t_2 - y_2 \\ \vdots \\ x'_P - t_1 - x_P \\ y'_P - t_2 - y_P \end{pmatrix} + \begin{pmatrix} 1 \\ 0 \\ 0 \\ 0 \\ 0 \\ 1 \\ 0 \end{pmatrix} \quad \text{(Expression 4)}$$

In Expression 4, G(M) is a function that returns a general inverse matrix of a matrix M. The general inverse matrix is a pseudo inverse matrix that functions with respect to a non-square matrix. There are various kinds of general inverse matrixes. In this embodiment, the general inverse matrix is $G(M) = (M^T M)^{-1} M^T$ used in general when a least square solution is calculated. In Expression 4, $x_i$, $y_i$ (i=1, 2, . . . , and P) represents center coordinates of P patches present in the reference tile and $x'_i$, $y'_i$ (i=1, 2, . . . , and P) represents center coordinate estimated values of the patches of the reference tile estimated from the comparative tile. In Expression 4, $m_{11}$, $m_{12}$, $m_{21}$, $m_{22}$, $s_1$, $s_2$, $t_1$, and $t_2$ are coefficients of Expression 2. Elements of the positional deviation u obtained by Expression 3 are ($x'_i-x_i$, $y'_i-y_i$) (i=1, 2, . . . , and P) and $t_1$, $t_2$ is known. Therefore, the coefficients $m_{11}$, $m_{12}$, $m_{21}$, $m_{22}$, $s_1$, and $s_2$ of the positional deviation/deformation function can be calculated. The obtained coefficients of the positional deviation/deformation function are stored in the main memory of the image processing apparatus 103.

The global alignment processing is processing for calculating positional deviation/deformation amount given to the tiles on the basis of the relative positional deviation/deformation between the two tiles obtained by the local alignment processing. As simplest processing, it is conceivable to adopt processing for determining, in order, positional deviation/deformation of tiles present in the periphery without giving deformation to a tile present at the upper left. However, when the upper left tile minutely rotates with respect to an absolute coordinate, the position of a tile at the lower right is likely to greatly deviate. When accuracy of a halfway relative positional deviation/deformation estimated value is low, a gap is likely to occur between the lower right tile and a tile adjacent to the lower right tile. The global alignment processing adopted in this embodiment is a method that suppresses the occurrence of these problems.

Figure 15B:
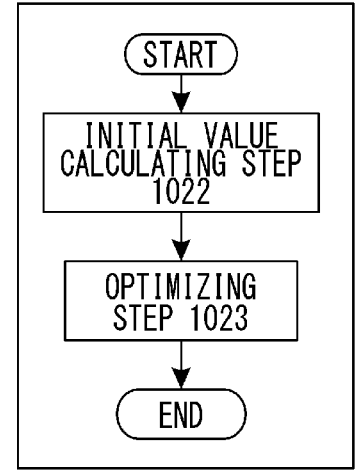

Global alignment processing 1021 is explained with reference to a flowchart of FIG. 15B. In an initial value calculating step 1022, a positional deviation/deformation amount with respect to one tile is calculated on the basis of relative deviation and deformation between two tiles. For example, when a leftmost tile is set as a reference in a situation in which four tiles are laterally arranged, a positional deviation/deformation amount of a rightmost tile is given by Expression 5 on the basis of the relative positional deviation between the two tiles.

[Math. 5]

$$x'=A_{1,4}(x)=A_{3,4}(A_{2,3}(A_{1,2}(x)))=M_{1,4} \cdot x + s_{1,4} + t_{1,4}$$

$$t_{1,4}=t_{1,2}t_{2,3}t_{3,4} \quad \text{(Expression 5)}$$

In Expression 5, $A_{i,k}(x)$ is the affine transformation (Expression 2) representing positional deviation/deformation of a k-th tile when an i-th tile is set as a reference. $M_{i,k}$, $s_{i,k}$, and $t_{i,k}$ are respectively a matrix representing deformation, a vector representing positional deviation, and a vector representing a center position of the k-th tile when the i-th tile is set as a reference. A composite function of the affine transformation is affine transformation. Further, since a vector $t_{1,4}$ representing the center position is given beforehand, unknown numbers $M_{1,4}$ and $s_{1,4}$ can be determined.

When the tiles are stitched on the basis of the positional deviation/deformation amount obtained by the initial value calculating step 1022, the plurality of tiles used in the calculation of Expression 5 are satisfactorily stitched. However, stitches easily appear between the tiles and tiles not used for the calculation. In an optimizing step 1023, adjustment of the positional deviation/deformation amount of the tiles obtained by the initial value calculating step 1022 is performed to suppress occurrence of artifact in stitches. Specifically, in a tile apart from the reference tile, the calculation of Expression 5 is performed in a plurality of different routes. An average of obtained values is adopted as a positional deviation/deformation amount. As a result, it is possible to determine the positional deviation/deformation amount of the tiles without causing a gap between the adjacent tiles.

Figure 15C:
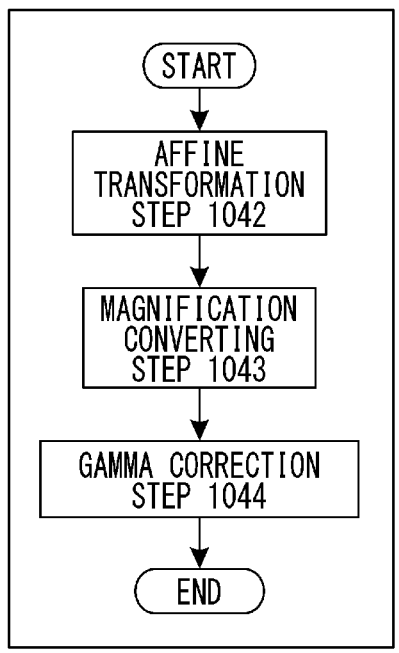

Deformation correction processing 1041 is explained with reference to a flowchart of FIG. 15C. In an affine transformation step 1042, first, a coordinate value in a correction target tile corresponding to a pixel of a tile after the affine transformation processing (hereinafter referred to as pixel of attention) is calculated on the basis of Expression 6.

[Math. 6]

$$x' = M' \cdot x + s' + t' = \begin{bmatrix} m'_{11} & m'_{12} \\ m'_{21} & m'_{22} \end{bmatrix} \cdot \begin{pmatrix} x \\ y \end{pmatrix} + \begin{pmatrix} s'_1 \\ s'_2 \end{pmatrix} + \begin{pmatrix} t'_1 \\ t'_2 \end{pmatrix} \quad \text{(Expression 6)}$$

In Expression 6, x, y is a coordinate value of the pixel of attention and x', y' (in Expression 6, represented by a vector x') is a coordinate value of the pixel of attention in the correction target tile (the origin is a center point of the reference tile). In Expression 6, $t'_1$, $t'_2$ is a coordinate value of a center point of a tile used for correction (the origin is the center of the reference tile). In Expression 6, $m'_{11}$ to $m'_{22}$ and $s'_1$, and $s'_2$ are positional deviation/deformation amounts for each of tiles obtained by the global alignment processing 1021.

A value of the pixel of attention in the correction target tile is calculated by neighboring pixel interpolation. In the tile after the affine transformation processing, the pixel of attention is raster-scanned to obtain all pixel values in the tile after the affine transformation processing.

In a magnification converting step 1043, image data obtained by multiplying the tile after the affine transformation processing with a predetermined magnification is generated. This is for the purpose of simplifying magnification conversion processing during display by creating image data given with different magnifications in advance. In a gamma correction step 1044, gamma correction is performed on the tile after the affine transformation processing and the tile after the magnification transformation processing. The magnification converting step 1043 and the gamma correction step 1044 may be omitted when unnecessary.

Figure 15D:
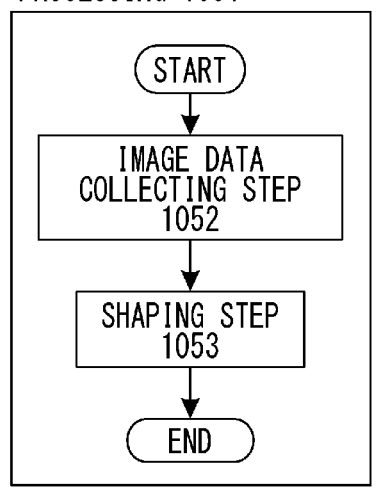

The image combination processing 1051 is explained with reference to a flowchart described in FIG. 15D. In an image data collecting step 1052, tiles generated in the image combining process having the target state numbers equal to or smaller than N are collected for each of same magnifications. In a shaping step 1053, one of overlapping segments of adjacent two tiles is deleted and then the two tiles are stitched to shape the two tiles into one image data. An image format is determined depending on a display program. For example, when the display program is compatible with display of JPEG compressed data and switching display of different magnifications, a format in which different JPEG compressed data are collected in one ZIP compression folder is adopted for each of the magnifications.

As explained above, it is possible to generate post-combination image data, which is an output of the microscope imaging system.

In this way, in the first embodiment, when the image processing apparatus sequentially acquires the plurality of tiles (partial image data) from the imaging apparatus or the image server and stitches the tiles to generate overall image data, the plurality of processes calculate local correction amounts for the tiles independently and in parallel. The operations of the processes are controlled on the basis of the state information of the tiles managed by state managing unit, whereby the calculation processing for correction amounts is sequentially started from the tile, necessary data of which is prepared. The exclusive control is performed on the tiles for which, for example, the calculation processing for the correction amounts is in progress such that the other processes do not perform redundant processing. Therefore, it is possible to provide the microscope imaging system that can efficiently calculate a correction amount for stitching and generate combined image data in a short time even under an environment in which acquisition timing and acquisition order of tiles are not decided (could change).

Second Embodiment

A second embodiment of the present invention is explained.

The second embodiment is an image processing apparatus having a function of stitching a plurality of tiles (partial image data) photographed at different magnifications. As in the first embodiment, even in a state in which arrival order and arrival timing of tiles at the image processing apparatus are not decided, the image processing apparatus executes stitching at high speed making use of parallel processing.

Since apparatuses same as the apparatuses in the first embodiment are used, an apparatus configuration is explained with reference to FIG. 2. The image processing apparatus 103 is a commercially available work station. The imaging apparatus 102 and the image processing apparatus 103 are connected by the network cable 105. Data can be transferred between the imaging apparatus 102 and the image processing apparatus 103. The image processing apparatus 103 monitors data sent from the imaging apparatus 102, executes image processing according to content and timing of the data, and generates a stitched image.

<Image Processing Performed in the Image Processing Apparatus (Data Exchange Performed Between the Components)>

As in the image processing apparatus in the first embodiment, the image processing performed in the image processing apparatus 103 is executed while exchanging data between a plurality of components (a plurality of processes executed by a program and a table for state management allocated to a shared memory). The data exchange is explained with reference to FIG. 16 and FIG. 17. As individual processing executed in the components, only individual processing different from the processing of the image processing apparatus in the first embodiment is explained.

In the main memory of the image processing apparatus 103, a memory region, which different processes can access, is secured. One variable (referred to as execution start flag) is allocated to the shared memory region before image processing execution.

Before the image processing execution, the execution start flag is set to an initial value 0 and only a process for carrying out data reception (hereinafter, data receiving process) is executed.

Figure 16:
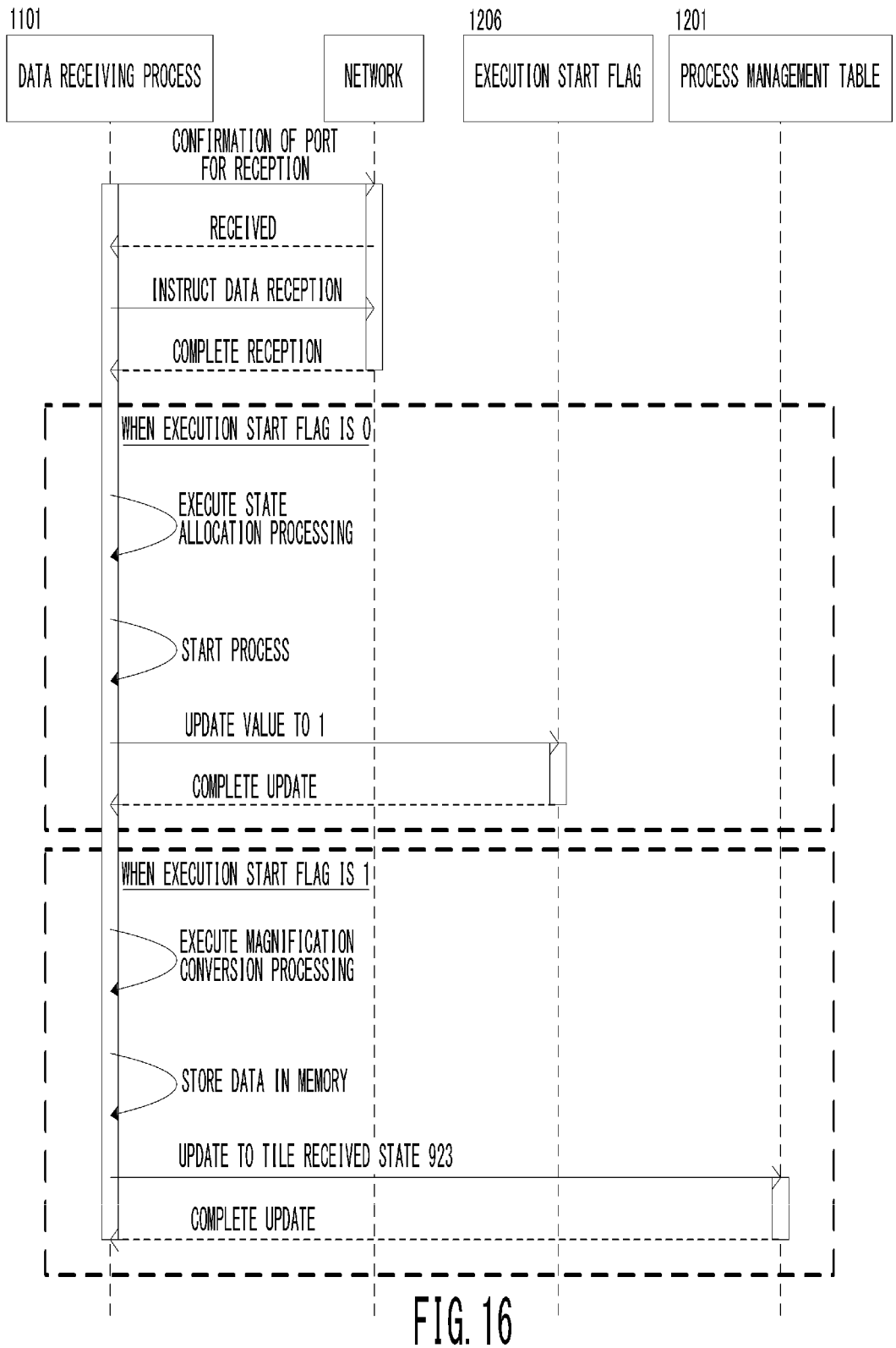
FIG. 16 is a sequence chart of a data receiving process in a second embodiment.

Data exchange performed between a data receiving process 1101 and the components is explained with reference to FIG. 16. In a state in which the execution start flag is 0, the data receiving process 1101 monitors a specific port of a network until imaging range data is received. The imaging range data is equivalent to the state table in the first embodiment and includes the size of an image sensor, x, y coordinate values of a three-axis stage in state numbers, and the magnification of an objective lens used during photographing. That is, the imaging range data can also be considered information concerning the sizes (the resolutions) and the arrangement of tiles.

Subsequently, the process 1101 additionally allocates, on the basis of the imaging range data, five arrays to the shared memory according to state allocation processing explained below. Thereafter, the process 1101 starts a positional deviation/deformation amount acquiring process 1102 and an image combining process 1103 explained below, updates the execution start flag to 1, and then returns to the monitoring of the port.

When the execution start flag is 1, the process 1101 receives a post-color conversion processing tile transmitted from the imaging apparatus 102. Subsequently, after performing magnification conversion processing (resolution conversion processing) on the post-color conversion processing tile, the process 1101 stores the post-color conversion processing tile in the main memory. The magnification conversion processing is processing for performing digital zoom (expansion processing by image processing) on tiles imaged by an objective lens having low magnification in order to equalize the sizes (the resolutions) of all the tiles. In this embodiment, the sizes (the resolutions) of the tiles are adjusted to size (resolution) at maximum magnification. Conversely, the size (the resolution) may be adjusted to resolution at low magnification by performing reduction processing on tiles having high magnification. After updating the values of the process management table 1201 to the tile received state 923, the process 1101 returns to the monitoring state of the port.

The arrays additionally allocated to the shared memory are explained with reference to FIG. 18A to FIG. 18E. A first array shown in FIG. 18A is an array for managing an image processing execution state in tiles and is referred to as process management table 1201. A second array shown in FIG. 18B is a table for managing a stitching processing execution state in an overlapping segment between the tiles and is hereinafter referred to as alignment management table 1202. Unlike the alignment management tables 902 and 903 in the first embodiment, in the alignment management table 1202, an execution state of the local alignment processing is managed using, as an index, a number allocated to the overlapping segment between the tiles (hereinafter referred to as overlapping segment number). A third array shown in FIG. 18C is a table for retrieving overlapping segment numbers corresponding to state numbers (numbers of overlapping segments present in the tiles) and is referred to as forward direction correspondence relation table 1203. A fourth array shown in FIG. 18D is a table for retrieving state numbers (numbers of two tiles to which an overlapping segment belongs) corresponding to the overlapping segment number and is referred to as backward direction correspondence relation table 1204. An array shown in FIG. 18E is an array indicating an execution state of global alignment and is hereinafter referred to as global alignment execution state array 1205. In FIG. 18A to FIG. 18E, only items related to execution state management are described. However, for example, imaging information and the like corresponding to state numbers may be added to the tables to make it possible to retrieve the imaging information and the like simultaneously with the execution state. Information (a position and width) concerning the overlapping segment may be given to the alignment management table to make it possible to retrieve the information simultaneously with the execution state.

The image processing execution state and the stitching processing execution state are the same as those in first embodiment, and the explanation thereof is omitted. As in the first embodiment, the processes perform retrieval, monitoring, and update of the processing execution state in the process management table 1201 and the alignment management table 1202, whereby exclusive control is performed to prevent conflict between the processes from occurring.

Figure 17:
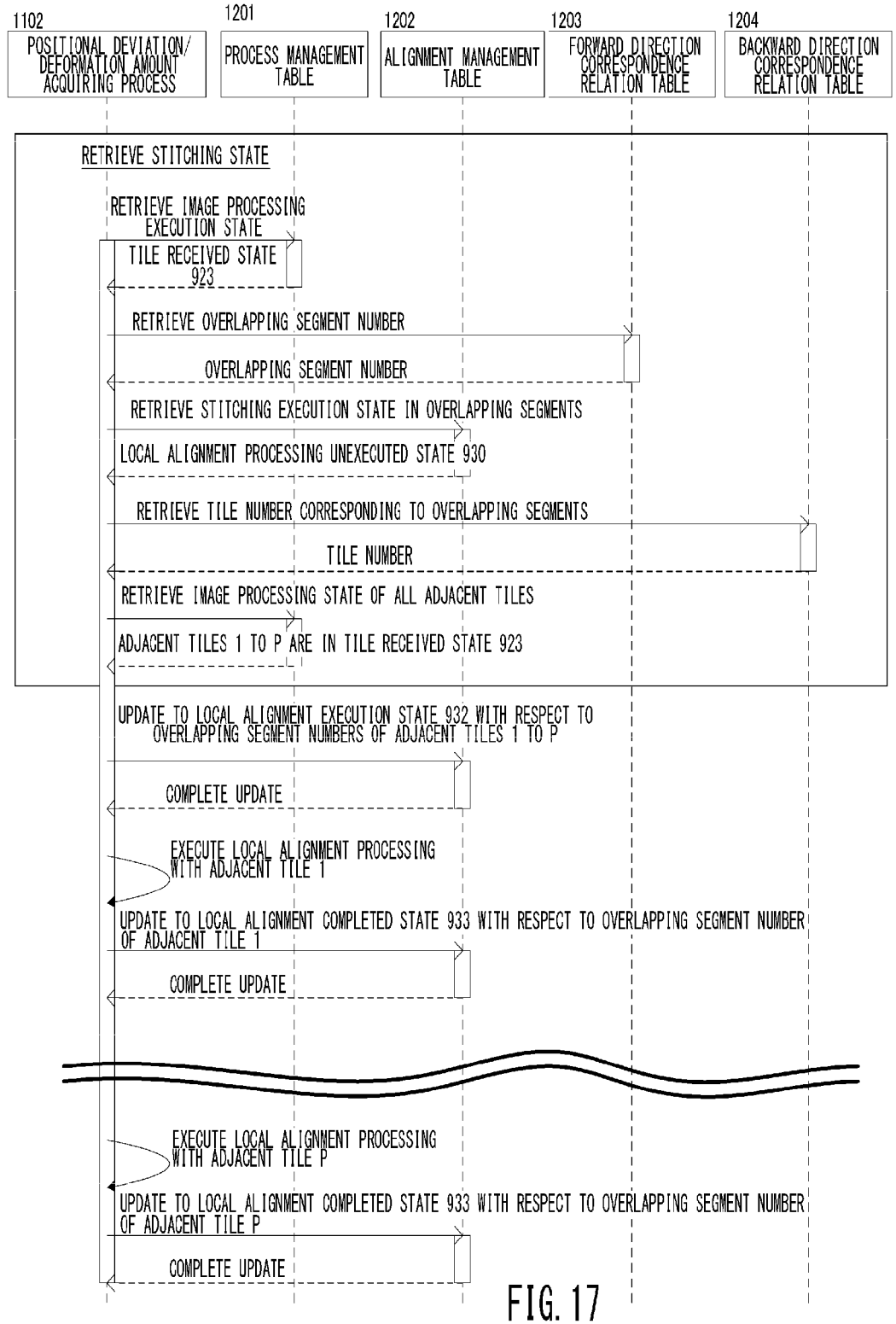
FIG. 17 is a sequence chart of a positional deviation/deformation amount acquiring process in the second embodiment.

Data exchange performed between the positional deviation/deformation amount acquiring process 1102 and the components is explained with reference to FIG. 17. At the start of the execution of the positional deviation/deformation amount acquiring process 1102, the target state number is initialized to 1 or a predetermined value. The process 1102 monitors an image processing execution state of the target state number to tiles until the image processing execution state changes to the tile received state 923. Note that, in FIG. 17, only one process 1102 is shown. However, as in the first embodiment, a plurality of the positional deviation/deformation amount acquiring processes 1102 are executed in parallel.

Subsequently, the process 1102 executes the stitching state retrieval using the process management table 1201, the alignment management table 1202, the forward direction correspondence relation table 1203, and the backward direction correspondence relation table 1204.

In the stitching state retrieval, first, the process 1102 acquires an overlapping segment number related to a tile of the target state number from the forward direction correspondence relation table 1203 and acquires a stitching processing execution state according to the alignment management table 1202. If there is an overlapping segment of the local alignment unexecuted state 930, the process 1102 acquires a state number of an adjacent tile using the backward direction correspondence relation table 1204 and acquires an image processing execution state of the adjacent tile according to the process management table 1201. By checking whether the image processing execution state of the adjacent tile is the tile received state 923, it is possible to obtain an overlapping segment number in which the adjacent tile has arrived and the local alignment is not implemented yet.

The above is the stitching state retrieval in the second embodiment. Unlike the first embodiment, the update to the local alignment execution state 932 is not included in the stitching state retrieval (the update of the processing execution state is not performed and only the acquisition of an overlapping segment number that can be calculated is implemented).

After the end of the stitching state retrieval, the process 1102 updates the stitching processing execution state of the detected overlapping segment (the overlapping segment for which the local alignment processing is executable) to the local alignment execution state 932. The process 1102 executes the local alignment processing on the adjacent tile and the tile of the target state number. The local alignment processing is the same as the local alignment processing in the first embodiment. After the execution of the local alignment processing, the process 1102 executes stitching state update. The stitching state update is operation for updating the values of the alignment management table 1202. A value corresponding to the overlapping segment number for which the local alignment is implemented is updated to the local alignment completed state 933.

In the first embodiment, after the tiles of all the state numbers are acquired and the local alignment of all the overlapping segments is completed, the global alignment processing is started. However, when the number of tiles to be treated is large, there are problems of an increase in a memory size and deterioration in throughput due to a delay of start time of the global alignment processing. In the second embodiment, the state numbers are divided into a plurality of groups in advance. After acquisition of tiles of the state numbers belonging to the groups and confirmation of local alignment implementation, the global alignment is executed on tiles belonging to the groups. The problems are solved by starting the global alignment for each of the groups.

The processes 1102 sequentially execute the process on the tiles, data of which are received. Processing for files of state numbers (P0 to Pn) belonging to one group P is executed. After confirming that execution state values of overlapping segment numbers P0 to Pm belonging to the group P of the alignment management table 1202 change to the local alignment completed state 933, the global-correction-amount acquiring unit 13 starts the global alignment processing. The global alignment processing and the image combination processing after the global alignment processing are the same as the global alignment processing and the image combination processing in the first embodiment. However, update and monitoring of the global alignment execution state are performed on elements of the global alignment execution state array 1205. The global alignment execution state array 1205 has elements corresponding to the number of the state number groups. An element, an execution state of which is retained, can be selected by designating an index corresponding to the state number group.

Simultaneously with the storage in the hard disk, all the tables and the arrays allocated to the shared memory and the state numbers retained by all the processes are initialized, whereby the image processing performed in the image processing apparatus ends.

<Image Processing (Individual Processing) Performed in the Image Processing Apparatus>

Details of image processing performed in the second embodiment are explained.

Figure 19:
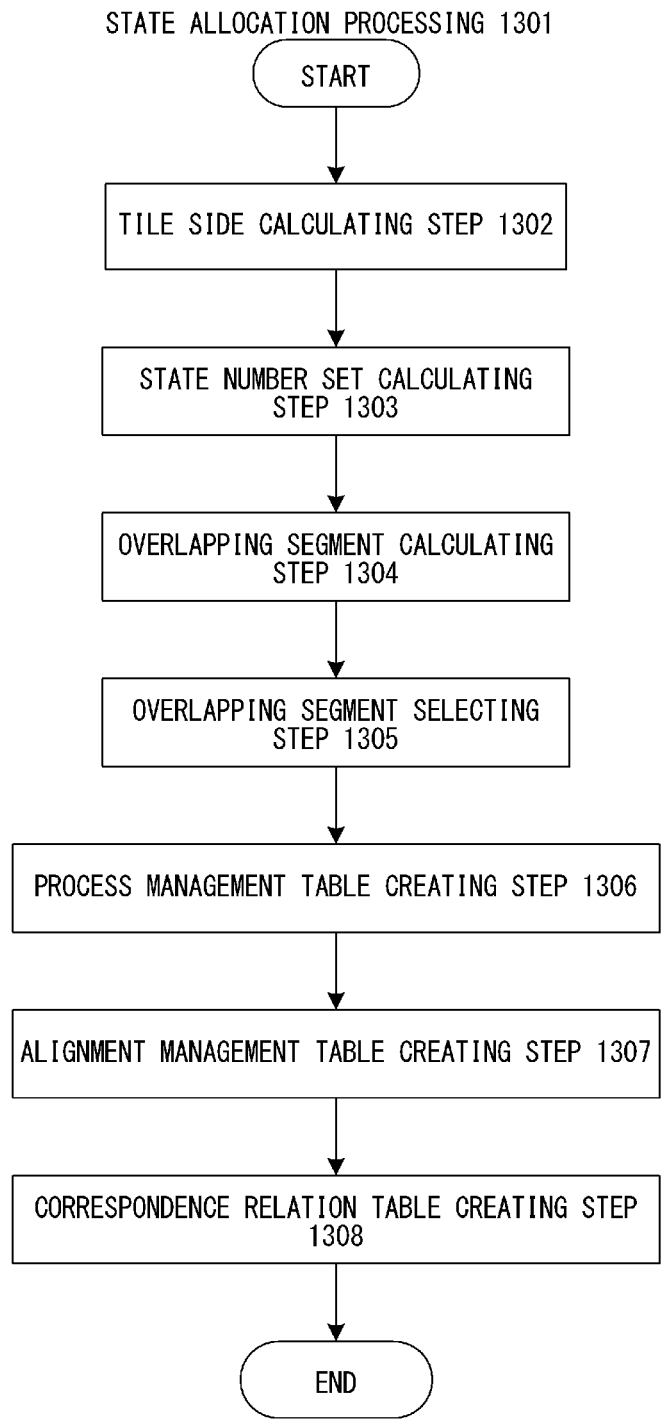
FIG. 19 is a diagram for explaining state allocation processing in the second embodiment.

State allocation processing 1301 by the data receiving process 1101 is explained with reference to a flowchart described in FIG. 19. The state allocation processing is processing for performing generation and initialization of the tables and the arrays shown in FIG. 18A to FIG. 18E on the basis of imaging range data (information concerning the sizes and the arrangement of the tiles).

In a tile side calculating step 1302, the process 1102 calculates y coordinate values of upper and lower sides and x coordinate values of left and right sides of tiles corresponding to the state numbers and creates a side coordinate table 1401 shown in FIG. 20A. In a state number set calculating step 1303, the process 1102 performs retrieval of a set of state numbers in which an overlapping segment is present and creates a state number set table 1402 shown in FIG. 20B. The overlapping segment is present when a loop formula below is true.

[Math. 7]

$$(X_H - X'_L > 0) \wedge (X'_H - X_L > 0) \wedge (Y_H - Y'_L > 0) \wedge (Y'_H - Y_L > 0) \quad \text{(Expression 7)}$$

In Expression 7, $Y_H$, $Y_L$, $X_L$, and $X_H$ are coordinate values of sides located above and below and on the left and the right of a first tile belonging to the state number set. $Y'_H$, $Y'_L$, $X'_L$, and $X'_H$ are coordinate values of sides located above and below and on the left and right of a second tile.

In an overlapping segment calculating step 1304, the process 1102 calculates a center position and width of the overlapping segment for the state number set and adds values to "center position" and "width" rows of the state number set table. A center position P and widths $W_X$ and $W_Y$ of the overlapping segment are given by Expression below.

[Math. 8]

$$P = \left( \frac{X''_H + X''_L}{2}, \frac{Y''_H + Y''_L}{2} \right) \quad \text{(Expression 8)}$$

$$W_X = \frac{X''_H - X''_L}{2} 2M_x$$

$$W_Y = \frac{Y''_H - Y''_L}{2} 2M_y$$

In Expression 8, $Y''_H = \min(Y_H, Y'_H)$, $Y''_L = \max(Y_L, Y'_L)$, $X''_H = \min(X_H, X'_H)$, and $X''_L = \max(X_L, X'_L)$. $M_x$ is width of a margin given to the left and right of the overlapping segment and $M_y$ is width of a margin given to above and below the overlapping segment. When there is rotational/positional deviation during imaging, since the positions of the tiles deviate, the size of the overlapping segment decreases. The width of the overlapping segment is set small by subtracting, in advance, the margins from ideal widths estimated from coordinate vales of the sides.

In an overlapping segment selecting step 1305, the process 1102 compares the widths $W_X$ and $W_Y$ and a predetermined threshold. When any one of the widths is smaller than the threshold, the process 1102 deletes a row corresponding to the width from the state number set table 1402 (that is, the state number set is not adopted). In a process management table creating step 1306, the process 1102 creates the process management table 1201 on the basis of state numbers obtained from the imaging range data and initializes the values of the process management table 1201 to the unacquired state 921. In an alignment management table creating step 1307, the process 1102 creates the alignment management table 1202 using a row number of the state number set table 1402 as the overlapping segment number and initializes the values of the alignment management table 1202 to the local alignment unexecuted state 930. In a correspondence relation table creating step 1308, the process 1102 creates the forward direction correspondence relation table 1203 and the backward direction correspondence relation table 1204 on the basis of a relation between the overlapping segment number (the row number) and the state number set described in the state number set table 1402.

The value of the imaging range data and the values (the center position, the width, and the like of the overlapping region) of the state number set table 1402 are necessary in the local alignment processing. Therefore, the values are stored in the main memory. The values may be respectively added to the process management table 1201 and the alignment management table 1202 to make it possible to retrieve the values from the positional deviation/deformation amount acquiring process and the image combining process.

The local alignment processing itself is the same as the local alignment processing in the first embodiment. However, definitions of a reference tile and a comparative tile are different from the definitions in the first embodiment. In this embodiment, a tile with a small state number is set as the reference tile and a tile with a large state number is set as the comparative tile.

The global alignment processing is also the same as the global alignment processing in the first embodiment. In this embodiment, the tiles are not always disposed above and below and on the left and the right. Therefore, it is difficult to understand a determination method for a plurality of routes in the optimizing step 1023. In this embodiment, in order to calculate a route between two tiles, the forward direction correspondence relation table 1203 and the backward direction correspondence relation table 1204 are used. An adjacent tile to one of the two tiles is obtained by, after calculating all overlapping segments according to the forward direction correspondence relation table 1203, calculating tiles more closely in contact with the overlapping segments according to the backward direction correspondence relation table 1204. By repeating the retrieval of the adjacent tile a fixed number of tiles, a state number of the other of the two tiles is obtained. The adjacent tile obtained during the retrieval is set as a route between the two tiles.

In this embodiment, with the configuration of the second embodiment of the present invention, it is also possible to obtain action and effects same as the action and effects in the first embodiment. Further, in this embodiment, the image processing apparatus calculates a correspondence relation of stitching on the basis of information concerning the sizes and the arrangement of the tiles according to the state allocation processing and performs generation and initialization of necessary tables and arrays. Therefore, it is possible to realize efficient stitching processing even in an environment in which, in addition to acquisition order and acquisition timing of tiles, the positions and the size of the tiles are not decided (that is, there are a difference in magnification, rotational deviation/positional deviation, and the like). Further, by implementing the global alignment for each of partial sets of the tiles, it is possible to suppress deterioration in throughput that occur when acquisition of all the tiles is waited.

Note that, in this embodiment, the state allocation processing is implemented on the basis of information such as the size of the image sensor, the x, y coordinate values of the three-axis stage in the state numbers, the magnification of the objective lens used during photographing, and the widths of the margins given to above and below and on the left and right of the overlapping segment. However, these are examples. Concerning the information concerning the sizes and the arrangement of the tiles and other data formats, any information and data formats may be used. That is, one or more kinds of information necessary for calculation only have to be used out of the information concerning the sizes and the arrangement of the tiles such as the shape, the size, the position, the number, and an estimated positional deviation amount and an estimated rotational deviation amount of the overlapping segments (stitching places).

Third Embodiment

A third embodiment of the present invention is explained. The third embodiment is different from the first embodiment in that all the functions of the image processing apparatus in the first embodiment are mounted in the imaging apparatus and in that the position selection for the patches performed in the local alignment processing is implemented in the imaging processing board. Otherwise, the third embodiment is the same as the configuration in the first embodiment.

Figure 21:
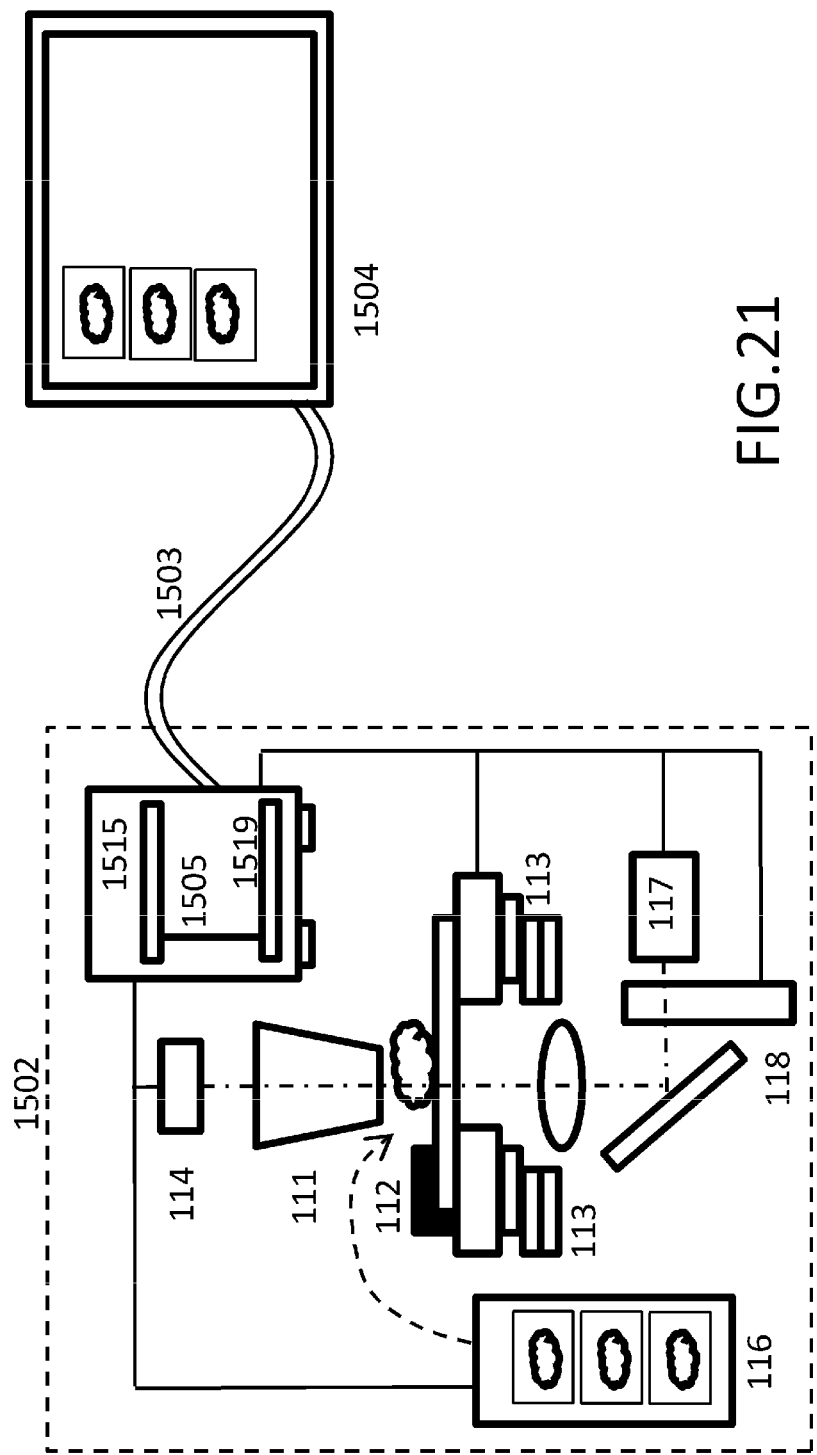
FIG. 21 is a configuration diagram of an imaging apparatus in a third embodiment.

The apparatus configuration is explained with reference to FIG. 21. The apparatus configuration is different from the apparatus configuration in the first embodiment (FIG. 2) in that an imaging apparatus 1502 includes an image processing board 1519. The image processing board 1519 is a motherboard of a PC. Like the image processing apparatus 103 in the first embodiment, the image processing board 1519 is used as a computer for control as well. An imaging processing board 1515 and the image processing board 1519 are connected by a network cable or an internal bus 1505 and can bidirectionally perform communication. The imaging apparatus 1502 is connected to, via a network 1503, an external information terminal 1504 that performs input and output through a GUI displayed on a touch panel. The instruction for imaging range selection or the like performed from the control apparatus 104 in the first embodiment is performed from the external information terminal 1504. As the external information terminal 1504, a tablet PC, a mobile PC, a smart phone, and the like can be used.

Figure 22:
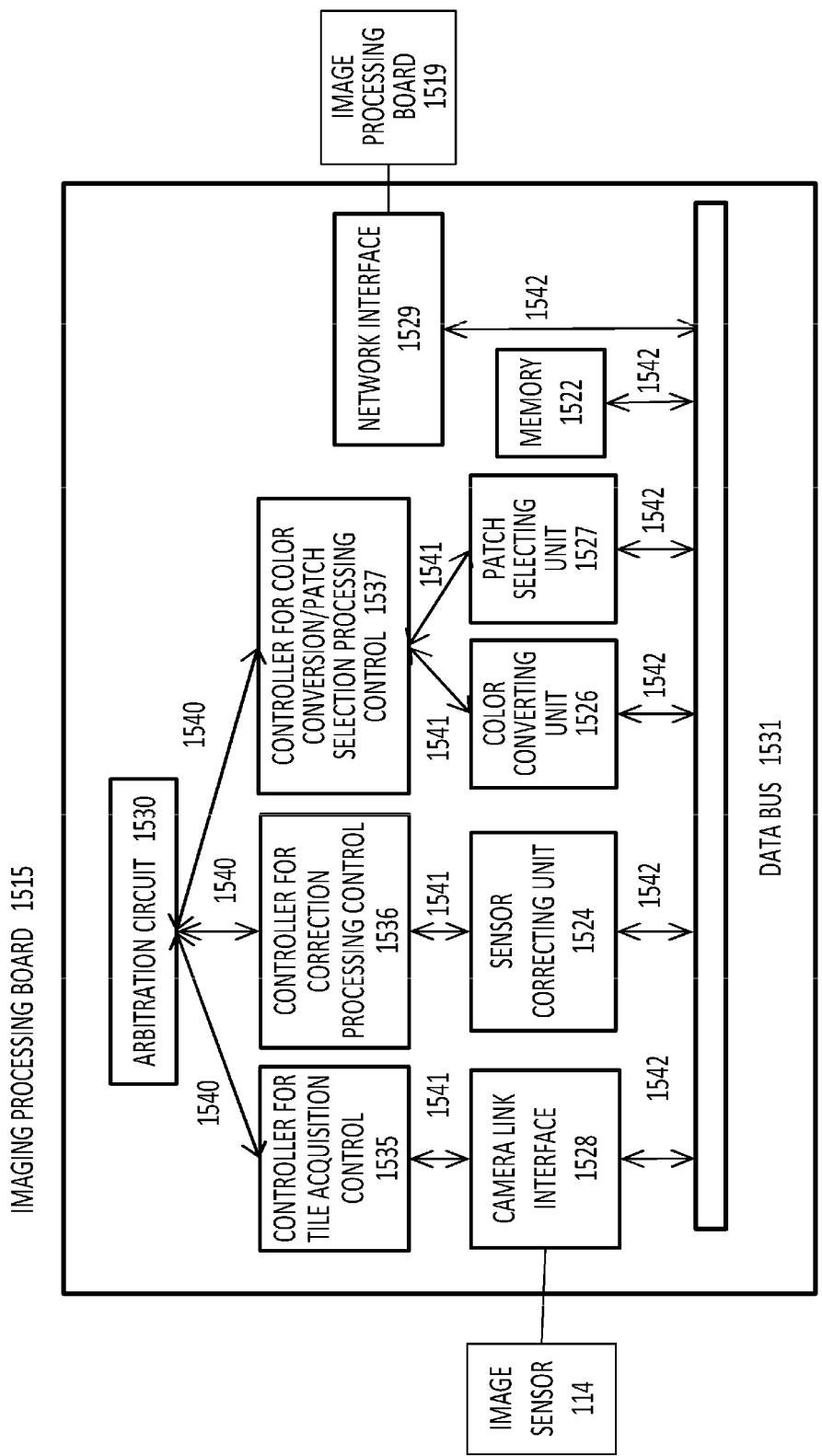
FIG. 22 is a configuration diagram of an imaging processing board of the imaging apparatus in the third embodiment.

The configuration of the imaging processing board 1515 is explained with reference to FIG. 22. The imaging processing board 1515 includes a memory 1522, a sensor correcting unit 1524, a color converting unit 1526, a patch selecting unit 1527, a camera link interface 1528, and a network interface 1529. The imaging processing board 1515 includes a controller for tile acquisition control 1535, a controller for correction processing control 1536, and a controller for color conversion/patch selection processing control 1537. After acquiring signals (hereinafter referred to as data bus occupation permission signals) 1540 representing occupation permission of a data bus from an arbitration circuit 1530, the controllers send processing start instructions 1541 to the components connected by a data bus 1531 and execute image processing for each of the components. Reference numeral 1542 denotes a flow of data.

A flow of imaging is the same as the flow in the first embodiment. Therefore, explanation of the flow is omitted. In image processing performed in the imaging processing board 1515 (data exchange performed among the components), in addition to the processing performed in the first embodiment, an imaging state and processing related to patch selection processing are added. In the imaging state, a color conversion/patch selection processing execution state 1601 and a color conversion/patch selection processing completed state 1602 are added.

Figure 23:
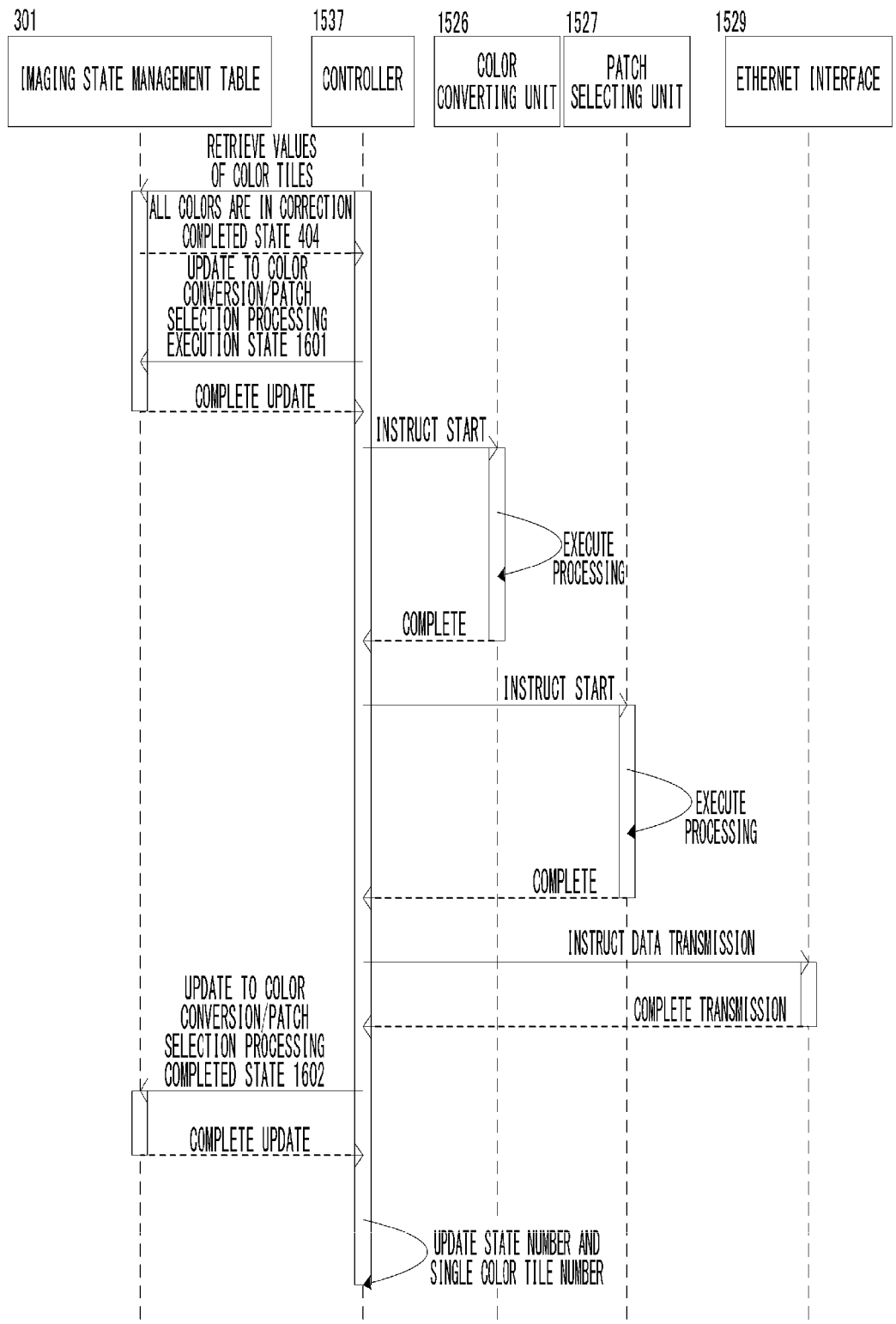
FIG. 23 is a sequence chart of color conversion processing and patch selection processing in the third embodiment.

Data exchange performed by the controller for color conversion/patch selection processing control 1537 is explained with reference to FIG. 23. The controller 1537 executes patch selection processing by the patch selecting unit 1541 after the execution of color conversion processing by the color converting unit 1526 and transfers a post-color conversion tile and patch position data explained below to the image processing board 1519.

Figure 24:
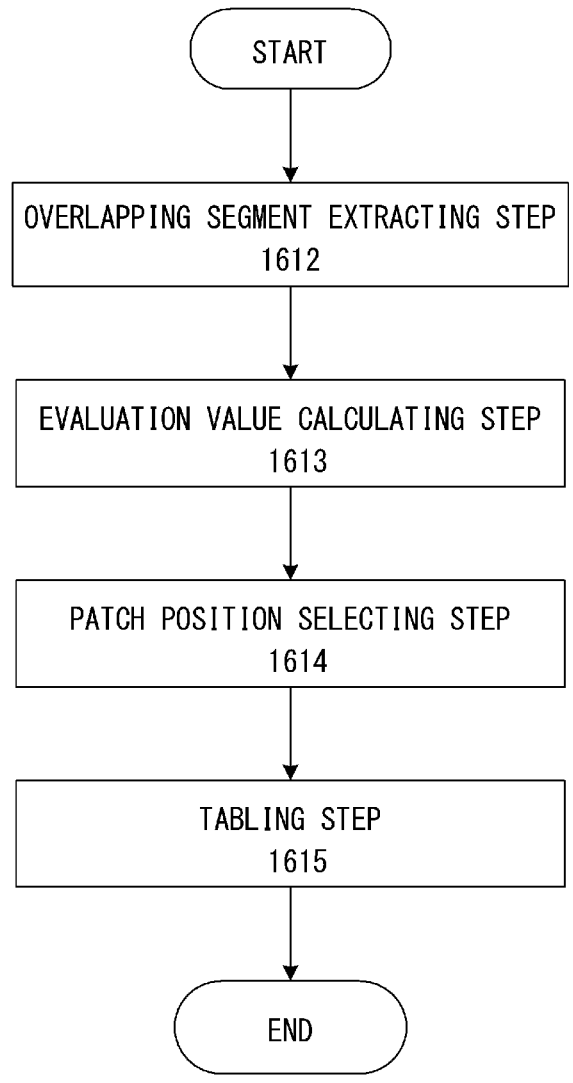
FIG. 24 is a diagram for explaining patch selection processing in the third embodiment.

Patch selection processing 1611 by the patch selecting unit 1541 is explained with reference to FIG. 24. In an overlapping segment extracting step 1612, the patch selecting unit 1541 extracts overlapping segments located on the right side and the lower side of a specific color (e.g., G of RGB) of the post-color conversion tile. In an evaluation value calculating step 1613, the patch selecting unit 1541 calculates, for pixels of the overlapping segments, an evaluation value for determining whether the pixels include texture having a fine structure (a high-frequency component). As the evaluation value, normalized variance used in the tile acquisition (the focusing position detecting step 203) in the first embodiment can be used. In a patch position selecting step 1614, the patch selecting unit 1541 selects several points having high evaluation values from the overlapping segments on the right side and the lower side. These points are set as center positions of patches. In a tabling step 1615, the patch selecting unit 1541 aggregates the obtained center positions of the patches as a table and sets the center positions as additional information of the post-color conversion tile.

Processing in the image processing board 1519 is the same as the processing of the image processing apparatus 103 in the first embodiment. However, the processing is different from the processing of the image processing apparatus 103 in that, since patch position data is already obtained, patch selection is not performed in the local alignment processing. The patch selection is higher in speed when the patch selection is executed in the imaging processing board 1515 than when the patch selection is executed in the image processing board 1519. As a result, the entire processing is increased in speed.

In this way, according to the third embodiment of the present invention, it is possible to obtain action and effects same as the action and effects in the embodiments explained above. This embodiment adopts the configuration for performing the stitching processing with the image processing board 1519 provided in the imaging apparatus. Therefore, it is possible to perform the stitching processing at higher speed than in the embodiments explained above.

Other Embodiments

The configurations in the embodiments explained above are specific examples of the present invention. The scope of the present invention is not limited to the scopes in the embodiments. For example, in the above embodiments, it is monitored and determined for each of the tiles whether the acquisition of data necessary for local alignment is completed. However, the monitoring and the determination may be performed for each of the overlapping segments (the stitching places) between the adjacent two tiles. Usually, four adjacent tiles are stitched to one tile. Therefore, when the monitoring is performed for each of the tiles, the processing cannot be started until data of five tiles are collected. On the other hand, when the monitoring and the determination are performed for each of the stitching places, the local alignment processing can be started if data of at least adjacent two tiles are collected. Therefore, it is possible to perform more efficient processing.

An object of the imaging apparatus may be an object other than a pathological specimen. In the embodiments, the image data of RGB is used. However, a form of the image data may be any form. In the local alignment processing and the global alignment processing, RAW data may be used rather than the image data subjected to the processing such as the color conversion. In the embodiments, the image data is acquired from the imaging apparatus. However, image data imaged and stored in advance may be acquired from the image server. Image data acquired from both of the imaging apparatus and the image server may be stitched and combined.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-101078, filed on May 15, 2014 and Japanese Patent Application No. 2015-6071, filed on Jan. 15, 2015, which are hereby incorporated by reference herein in their entirety.

REFERENCE SIGNS

11: Image acquiring unit, 12: Correction-amount acquiring unit, 13: Global-correction-amount acquiring unit, 14: State managing unit, 15: Image combining unit, 101: Microscope imaging system, 102: Imaging apparatus, 103: Image processing apparatus

The invention claimed is:

1. An image processing apparatus that stitches a plurality of partial image data to generate combined image data, the image processing apparatus comprising:
   an image acquiring unit that sequentially acquires the plurality of partial image data;
   a state managing unit that manages, as state information indicating a state of processing for each of the plurality of partial image data, state information including at least information indicating whether the acquisition of the partial image data by the image acquiring unit is completed;
   a correction-amount acquiring unit that acquires, for each of stitching places of the partial image data, a correction amount for correcting deviation among the partial image data to be stitched; and
   an image combining unit that corrects each of the plurality of partial image data on the basis of the correction amount for each of the stitching places acquired by the correction-amount acquiring unit, and generates combined image data obtained by stitching the partial image data after the correction,
   wherein the correction-amount acquiring unit is controlled on the basis of the state information to start processing for acquiring the correction amount from the partial image data or the stitching place for which acquisition of data necessary for acquiring the correction amount is completed other than the partial image data or the stitching place for which the processing for acquiring the correction amount is already completed or being executed.

2. The image processing apparatus according to claim 1, wherein the correction-amount acquiring unit is configured from a plurality of correction-amount acquiring units that operate independently from one another, and
   wherein processing for different partial image data or different stitching places is executed in parallel by the plurality of correction-amount acquiring units.

3. The image processing apparatus according to claim 1, further comprising a global-correction-amount acquiring unit that determines, on the basis of correction amounts of a plurality of stitching places acquired by the correction-amount acquiring unit, a second correction amount used in correction processing actually performed for each of the plurality of partial image data in the image combining unit.

4. The image processing apparatus according to claim 1, wherein, when image data imaged at a different magnification is included in the plurality of partial image data acquired by the image acquiring unit, the image acquiring unit performs magnification conversion processing on the image data imaged at the different magnification in order to equalize resolutions of all the partial image data.

5. The image processing apparatus according to claim 1, wherein, when starting processing for stitching the plurality of partial image data, the state managing unit determines a correspondence relation of stitching among the plurality of partial image data on the basis of information concerning sizes and arrangement of the plurality of partial image data.

6. The image processing apparatus according to claim 1, wherein the image acquiring unit acquires a plurality of partial image data to be stitched, from an imaging apparatus that dividedly images an object to obtain a plurality of partial image data or an image server that stores the plurality of partial image data obtained by the imaging apparatus or both of the imaging apparatus and the image server.

7. An imaging system comprising:
   an imaging apparatus that dividedly images an object to obtain a plurality of partial images; and
   the image processing apparatus according to claim 1 that acquires the plurality of partial image data from the imaging apparatus and stitches the plurality of partial image data to generate combined image data.

8. An image processing apparatus that stitches a plurality of partial image data to generate combined image data, the image processing apparatus comprising:
   an image acquiring unit that acquires the plurality of partial image data;
   a state managing unit that manages state information indicating a state of processing for each of the plurality of partial image data;
   a correction-amount acquiring unit that acquires, for each of stitching places of the partial image data, a correction amount for correcting deviation among the partial image data to be stitched; and
   an image combining unit that corrects each of the plurality of partial image data on the basis of the correction amount for each of the stitching places acquired by the correction-amount acquiring unit, and generates combined image data obtained by stitching the partial image data after the correction,
   wherein the correction-amount acquiring unit is configured from a plurality of correction-amount acquiring units that operate independently from one another,
   wherein processing for different partial image data or different stitching places is executed in parallel by the plurality of correction-amount acquiring units,
   wherein the state information includes information indicating whether the processing for acquiring the correction amount by the correction-amount acquiring unit is completed for each of the partial image data or each of the stitching places, and
   wherein the plurality of correction-amount acquiring units are each controlled on the basis of the state information such that the processing for acquiring the correction amount is started from the partial image data or the stitching place for which acquisition of data necessary for acquiring the correction amount is completed and is not redundantly performed on the partial image data or the stitching places for which the processing for acquiring the correction amount is already completed.

9. An image processing apparatus that stitches a plurality of partial image data to generate combined image data, the image processing apparatus comprising:

an image acquiring unit that acquires the plurality of partial image data;

a state managing unit that manages state information indicating a state of processing for each of the plurality of partial image data;

a correction-amount acquiring unit that acquires, for each of stitching places of the partial image data, a correction amount for correcting deviation among the partial image data to be stitched; and an image combining unit that corrects each of the plurality of partial image data on the basis of the correction amount for each of the stitching places acquired by the correction-amount acquiring unit, and generates combined image data obtained by stitching the partial image data after the correction, wherein the correction-amount acquiring unit is configured from a plurality of correction-amount acquiring units that operate independently from one another, wherein processing for different partial image data or different stitching places is executed in parallel by the plurality of correction-amount acquiring units, wherein the state information includes information indicating whether the processing for acquiring the correction amount by the correction-amount acquiring unit is being executed, for each of the partial image data or each of the stitching places, and wherein the plurality of correction-amount acquiring units are each controlled on the basis of the state information such that the processing for acquiring the correction amount is started from the partial image data or the stitching place for which acquisition of data necessary for acquiring the correction amount is completed and is not redundantly performed by other correction-amount acquiring unit on the partial image data or the stitching places for which the processing for acquiring the correction amount is being executed.

10. An image processing apparatus that stitches a plurality of partial image data to generate combined image data, the image processing apparatus comprising:

an image acquiring unit that acquires the plurality of partial image data;

a state managing unit that manages state information indicating a state of processing for each of the plurality of partial image data;

a correction-amount acquiring unit that acquires, for each of stitching places of the partial image data, a correction amount for correcting deviation among the partial image data to be stitched;

an image combining unit that corrects each of the plurality of partial image data on the basis of the correction amount for each of the stitching places acquired by the correction-amount acquiring unit, and generates combined image data obtained by stitching the partial image data after the correction; and a global-correction-amount acquiring unit that determines, on the basis of correction amounts of a plurality of stitching places acquired by the correction-amount acquiring unit, a second correction amount used in correction processing actually performed for each of the plurality of partial image data in the image combining unit, wherein the state information includes information indicating whether the processing for acquiring the correction amount by the correction-amount acquiring unit is completed for each of the partial image data or each of the stitching places, and wherein after confirming, on the basis of the state information, whether the processing for acquiring the correction amounts of the plurality of partial image data or the plurality of stitching places is completed, the global-correction-amount acquiring unit starts processing for determining the second correction amount.

11. The imaging system according to claim 7, wherein the imaging apparatus is a microscope apparatus.

12. A control method for an image processing apparatus that stitches a plurality of partial image data to generate combined image data, the control method comprising:

an image acquiring step for sequentially acquiring the plurality of partial image data;

a state managing step for managing, as state information indicating a state of processing for each of the plurality of partial image data, state information including at least information indicating whether the acquisition of the partial image data in the image acquiring step is completed;

a correction-amount acquiring step for acquiring, for each of stitching places of the partial image data, a correction amount for correcting deviation among the partial image data to be stitched; and an image combining step for correcting each of the plurality of partial image data on the basis of the correction amount for each of the stitching places acquired in the correction-amount acquiring step, and generating combined image data obtained by stitching the partial image data after the correction, wherein the correction-amount acquiring step is controlled on the basis of the state information to start processing for acquiring the correction amount from the partial image data or the stitching place for which acquisition of data necessary for acquiring the correction amount is completed other than the partial image data or the stitching place for which the processing for acquiring the correction amount is already completed or being executed.

13. A control method for an image processing apparatus that stitches a plurality of partial image data to generate combined image data, the control method comprising:

an image acquiring step for acquiring the plurality of partial image data;

a state managing step for managing state information indicating a state of processing for each of the plurality of partial image data;

a correction-amount acquiring step for acquiring, for each of stitching places of the partial image data, a correction amount for correcting deviation among the partial image data to be stitched; and an image combining step for correcting each of the plurality of partial image data on the basis of the correction amount for each of the stitching places acquired in the correction-amount acquiring step, and generating combined image data obtained by stitching the partial image data after the correction, wherein processing for different partial image data or different stitching places is executed in parallel by a plurality of correction-amount acquiring units that operate independently from one another in the correction-amount acquiring step, wherein the state information includes information indicating whether the processing for acquiring the correction amount in the correction-amount acquiring step is completed for each of the partial image data or each of the stitching places, and wherein the plurality of correction-amount acquiring units are each controlled on the basis of the state information such that the processing for acquiring the correction amount is started from the partial image data or the stitching place for which acquisition of data necessary for acquiring the correction amount is completed and is not redundantly performed on the partial image data or the stitching places for which the processing for acquiring the correction amount is already completed.

14. A control method for an image processing apparatus that stitches a plurality of partial image data to generate combined image data, the control method comprising:

an image acquiring step for acquiring the plurality of partial image data;

a state managing step for managing state information indicating a state of processing for each of the plurality of partial image data;

a correction-amount acquiring step for acquiring, for each of stitching places of the partial image data, a correction amount for correcting deviation among the partial image data to be stitched; and an image combining step for correcting each of the plurality of partial image data on the basis of the correction amount for each of the stitching places acquired in the correction-amount acquiring step, and generating combined image data obtained by stitching the partial image data after the correction, wherein processing for different partial image data or different stitching places is executed in parallel by a plurality of correction-amount acquiring units that operate independently from one another in the correction-amount acquiring step, wherein the state information includes information indicating whether the processing for acquiring the correction amount in the correction-amount acquiring step is being executed, for each of the partial image data or each of the stitching places, and wherein the plurality of correction-amount acquiring units are each controlled on the basis of the state information such that the processing for acquiring the correction amount is started from the partial image data or the stitching place for which acquisition of data necessary for acquiring the correction amount is completed and is not redundantly performed by other correction-amount acquiring unit on the partial image data or the stitching places for which the processing for acquiring the correction amount is being executed.

15. A control method for an image processing apparatus that stitches a plurality of partial image data to generate combined image data, the control method comprising:

an image acquiring step for acquiring the plurality of partial image data;

a state managing step for managing state information indicating a state of processing for each of the plurality of partial image data;

a correction-amount acquiring step for acquiring, for each of stitching places of the partial image data, a correction amount for correcting deviation among the partial image data to be stitched;

an image combining step for correcting each of the plurality of partial image data on the basis of the correction amount for each of the stitching places acquired in the correction-amount acquiring step, and generating combined image data obtained by stitching the partial image data after the correction; and a global-correction-amount acquiring step for determining, on the basis of correction amounts of a plurality of stitching places acquired in the correction-amount acquiring step, a second correction amount used in correction processing actually performed for each of the plurality of partial image data in the image combining step, wherein the state information includes information indicating whether the processing for acquiring the correction amount in the correction-amount acquiring step is completed for each of the partial image data or each of the stitching places, and wherein after confirming, on the basis of the state information, whether the processing for acquiring the correction amounts of the plurality of partial image data or the plurality of stitching places is completed, the global-correction-amount acquiring is controlled to start processing for determining the second correction amount.

* * * * *